(12) United States Patent
Nakamura et al.

(10) Patent No.: US 10,714,026 B2
(45) Date of Patent: Jul. 14, 2020

(54) DISPLAY DEVICE AND CONTROL METHOD OF DISPLAY DEVICE

(71) Applicant: Japan Display Inc., Minato-ku (JP)

(72) Inventors: Tenfu Nakamura, Tokyo (JP); Kentaro Okuyama, Tokyo (JP); Tae Kurokawa, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 16/218,555

(22) Filed: Dec. 13, 2018

(65) Prior Publication Data

US 2019/0197968 A1 Jun. 27, 2019

(30) Foreign Application Priority Data

Dec. 22, 2017 (JP) ................... 2017-246868

(51) Int. Cl.
*G09G 3/34* (2006.01)
*G02F 1/1334* (2006.01)
*G02F 1/13357* (2006.01)

(52) U.S. Cl.
CPC ......... *G09G 3/3413* (2013.01); *G02F 1/1334* (2013.01); *G02F 1/133602* (2013.01); *G09G 2310/0235* (2013.01); *G09G 2310/08* (2013.01); *G09G 2320/0271* (2013.01); *G09G 2320/064* (2013.01); *G09G 2320/0626* (2013.01); *G09G 2320/0633* (2013.01); *G09G 2320/0646* (2013.01); *G09G 2360/16* (2013.01)

(58) Field of Classification Search
CPC .... G09G 3/3413; G09G 3/342; G09G 3/3426; G09G 2310/0235; G09G 2310/08; G09G 2320/0271; G09G 2320/0626; G09G 2320/0633; G09G 2320/064; G09G 2320/0646; G09G 2360/16; G02F 1/1334; G02F 1/133602

See application file for complete search history.

(56) References Cited

U.S. PATENT DOCUMENTS

| | | | | |
|---|---|---|---|---|
| 8,558,781 B2* | 10/2013 | Wu | ....................... | G09G 3/2003 345/102 |
| 2004/0130884 A1* | 7/2004 | Yoo | ....................... | G02B 6/0028 362/613 |
| 2006/0227147 A1* | 10/2006 | Diels | ................... | G09G 3/3406 345/589 |
| 2007/0216636 A1* | 9/2007 | Lo | ........................ | G09G 3/3406 345/102 |

(Continued)

FOREIGN PATENT DOCUMENTS

JP 2016-109794 6/2016
JP 2016-145869 8/2016

*Primary Examiner* — Tom V Sheng
(74) *Attorney, Agent, or Firm* — Oblon, McClelland, Maier & Neustadt, L.L.P.

(57) ABSTRACT

According to one embodiment, a display device including a plurality of light sources of different luminous colors, a first substrate, a second substrate opposed to the first substrate, a liquid crystal layer interposed between the first and second substrates, to which light from the light sources enters, a display area on which an image is displayed, and a drive circuit configured to control quantity of light from each of the light sources on the basis of an analyzation result of an image signal used to display the image.

18 Claims, 17 Drawing Sheets

(56) References Cited

U.S. PATENT DOCUMENTS

| | | | | |
|---|---|---|---|---|
| 2008/0218468 | A1* | 9/2008 | Kim | G09G 3/3406 345/102 |
| 2008/0238856 | A1* | 10/2008 | Bhowmik | G09G 3/3406 345/102 |
| 2009/0122001 | A1* | 5/2009 | Cheung | G09G 3/2085 345/102 |
| 2010/0020006 | A1* | 1/2010 | Otani | G01J 1/32 345/102 |
| 2011/0141002 | A1* | 6/2011 | Kim | G09G 3/342 345/102 |
| 2011/0157244 | A1* | 6/2011 | Nakano | G09G 3/3413 345/690 |
| 2012/0044277 | A1* | 2/2012 | Adachi | G09G 3/3426 345/690 |
| 2013/0016141 | A1* | 1/2013 | Chang | G09G 3/3426 345/691 |
| 2013/0222221 | A1* | 8/2013 | An | G09G 3/3426 345/102 |
| 2013/0258711 | A1 | 10/2013 | Okuyama et al. | |
| 2014/0104521 | A1 | 4/2014 | Nishimura et al. | |
| 2014/0139461 | A1 | 5/2014 | Furukawa et al. | |
| 2014/0232834 | A1 | 8/2014 | Sato et al. | |
| 2014/0300528 | A1 | 10/2014 | Ebisui et al. | |
| 2016/0055805 | A1* | 2/2016 | Onogi | G09G 3/3426 345/691 |
| 2016/0070047 | A1 | 3/2016 | Okuyama et al. | |
| 2016/0163271 | A1 | 6/2016 | Sakaigawa et al. | |
| 2016/0189633 | A1* | 6/2016 | Lim | G09G 3/3406 348/51 |
| 2016/0231497 | A1 | 8/2016 | Kato | |
| 2017/0103715 | A1 | 4/2017 | Oyama | |
| 2017/0256192 | A1* | 9/2017 | Knepper | G09G 3/2003 |
| 2017/0263209 | A1* | 9/2017 | Ding | G09G 5/10 |
| 2018/0024403 | A1 | 1/2018 | Yata et al. | |
| 2018/0081248 | A1 | 3/2018 | Kitamura | |
| 2018/0211610 | A1 | 7/2018 | Kato | |
| 2018/0211611 | A1 | 7/2018 | Kato | |
| 2018/0211630 | A1 | 7/2018 | Kato | |

* cited by examiner

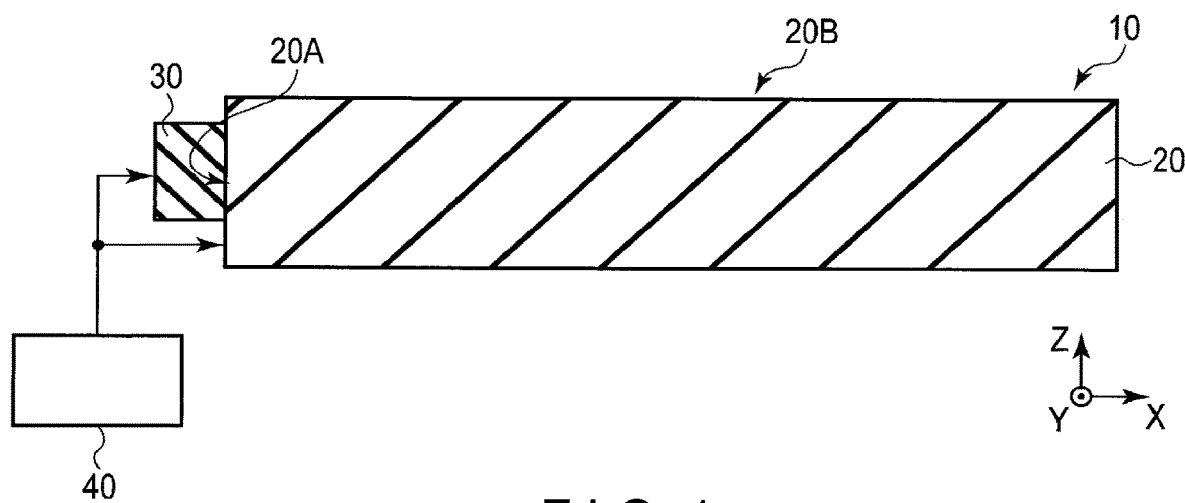
F I G. 1
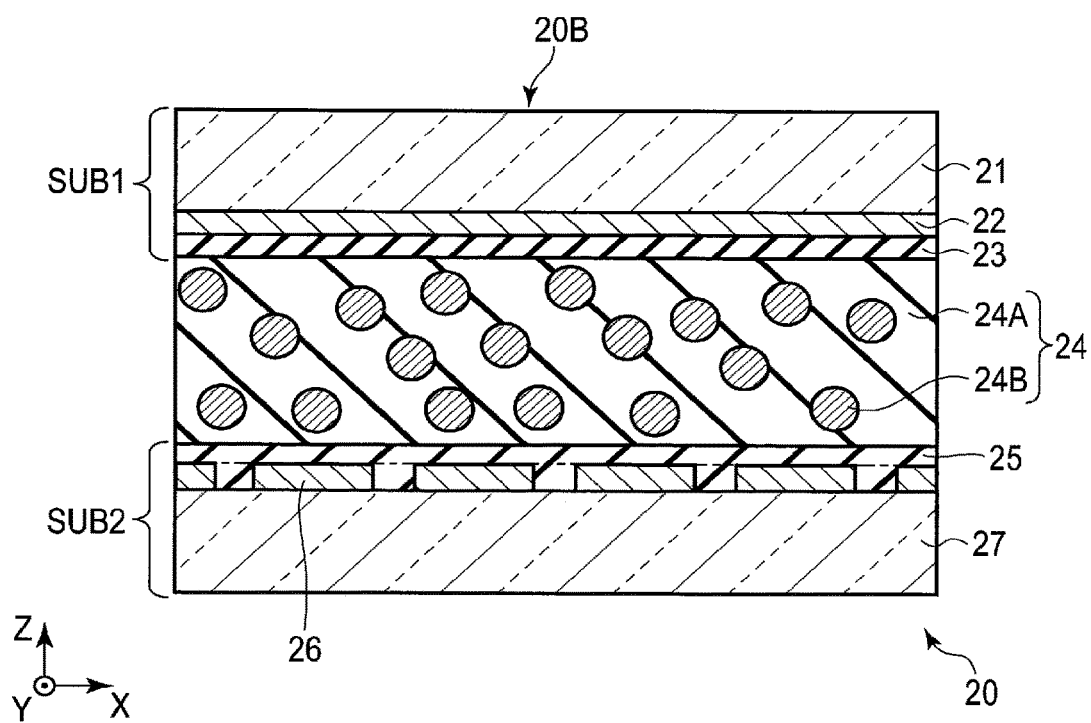
F I G. 2

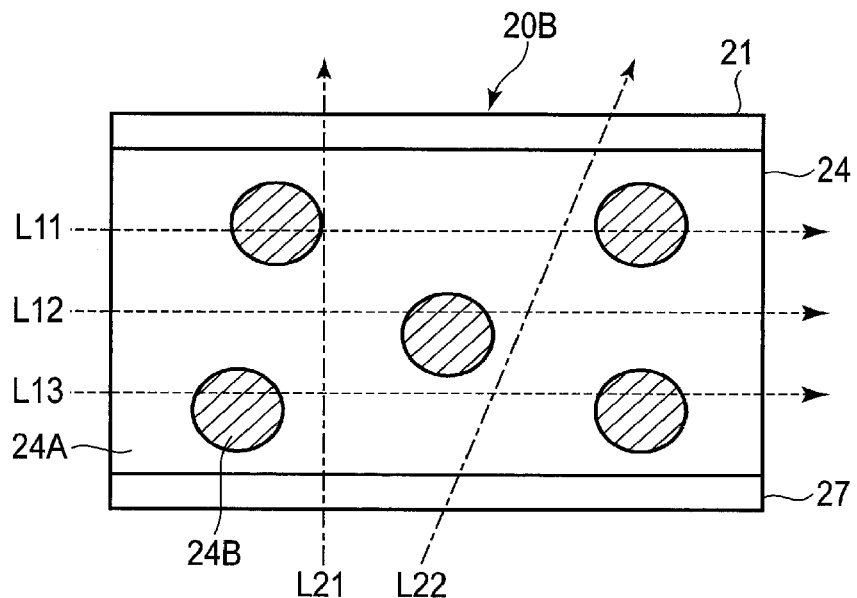
F I G. 3
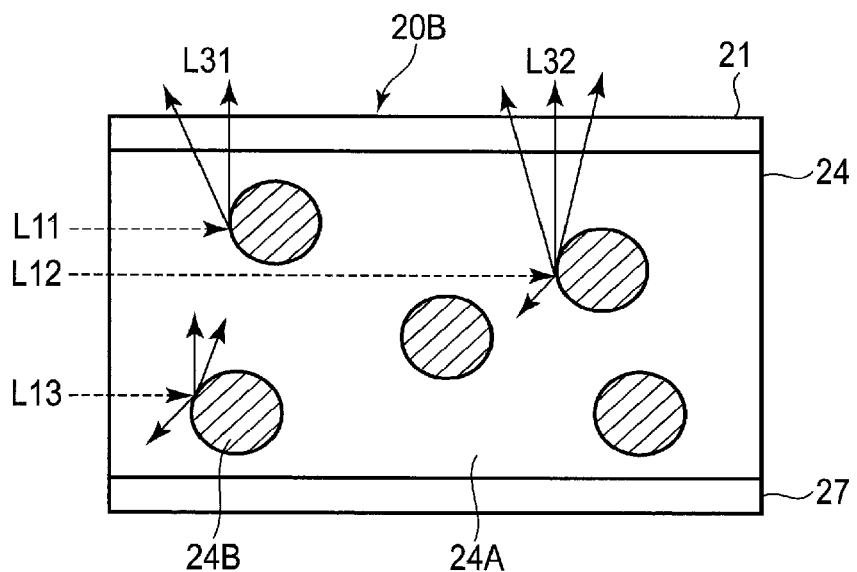
F I G. 4

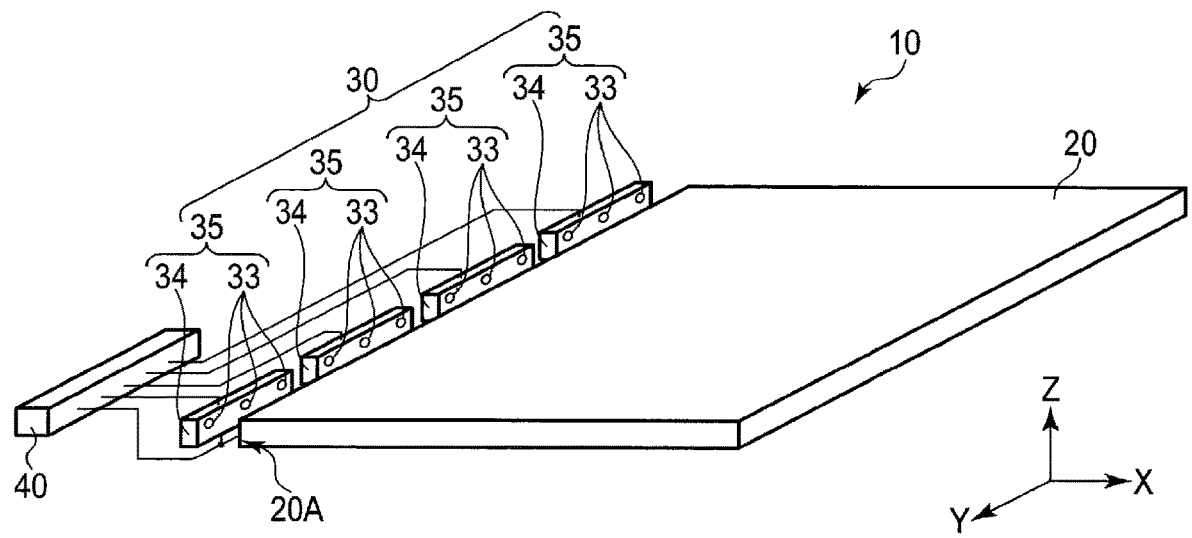
F I G. 5
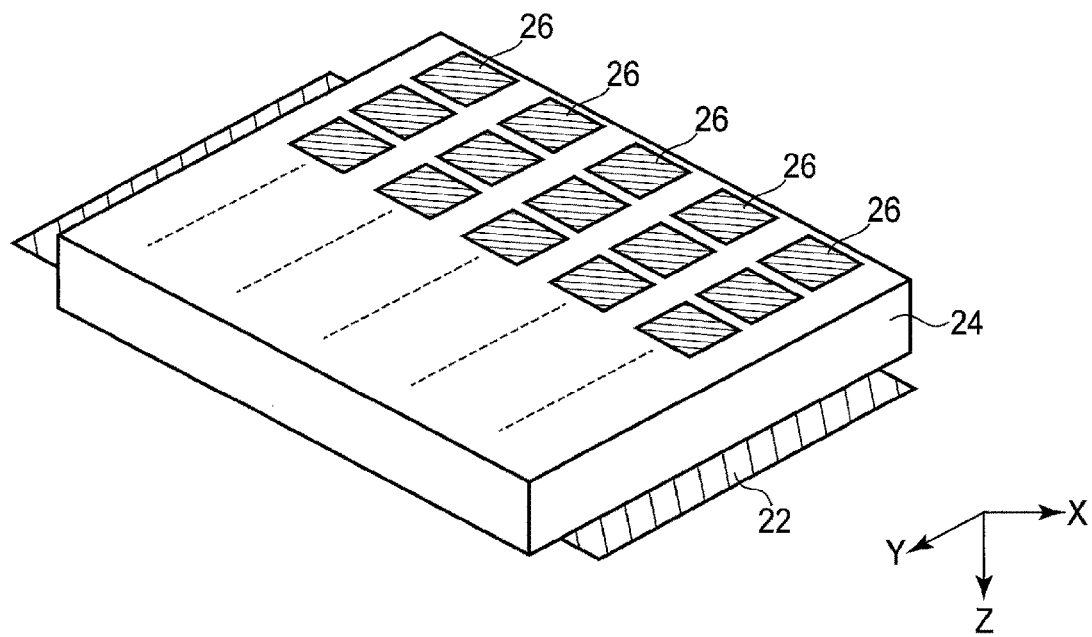
F I G. 6

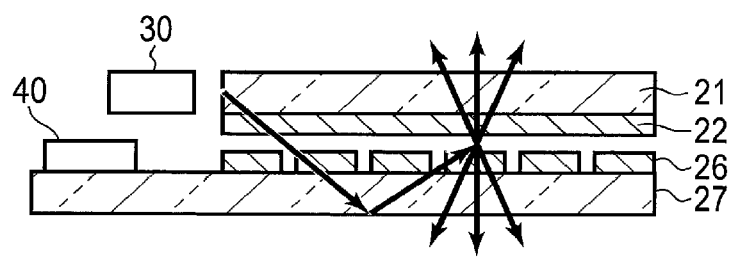
F I G. 9
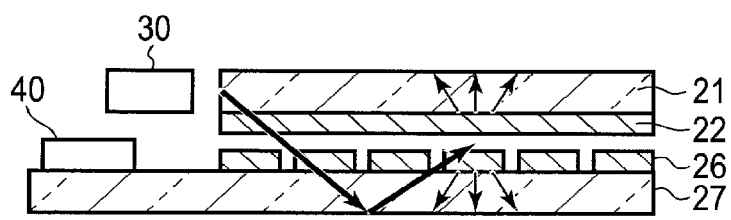
F I G. 10
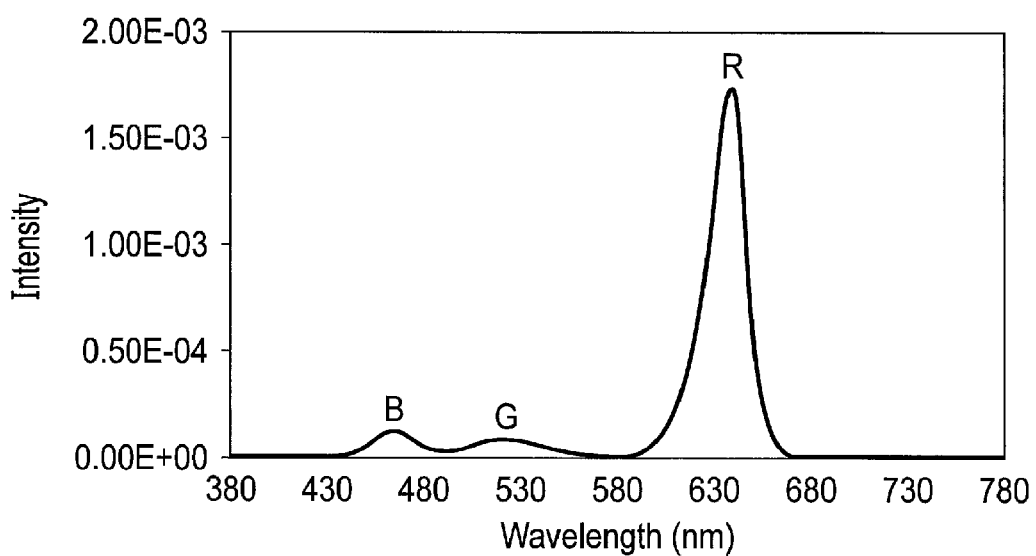
F I G. 11

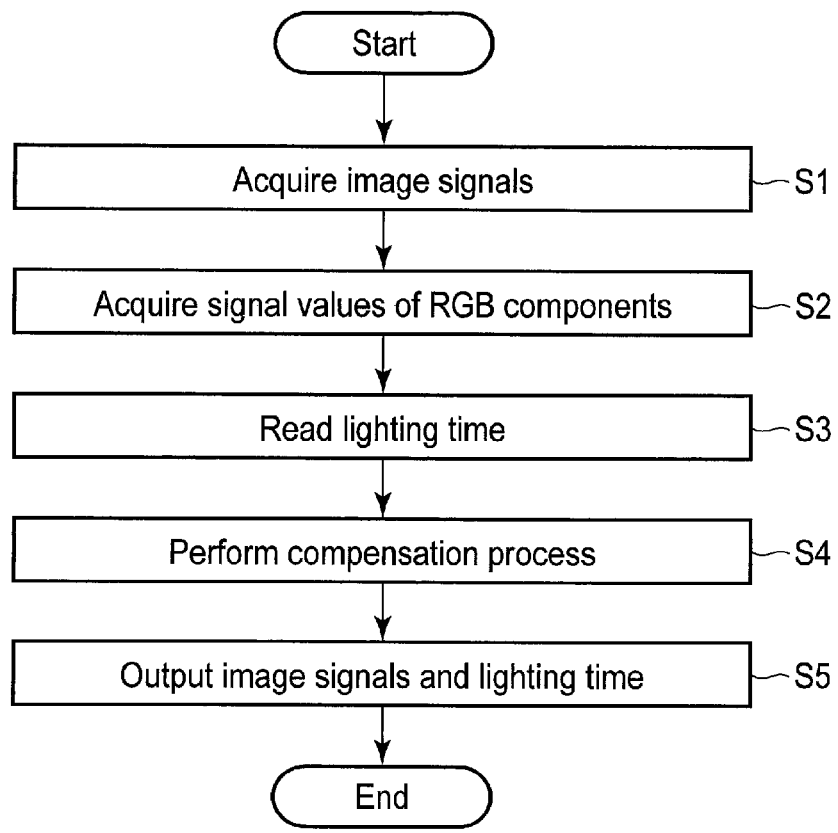
F I G. 14

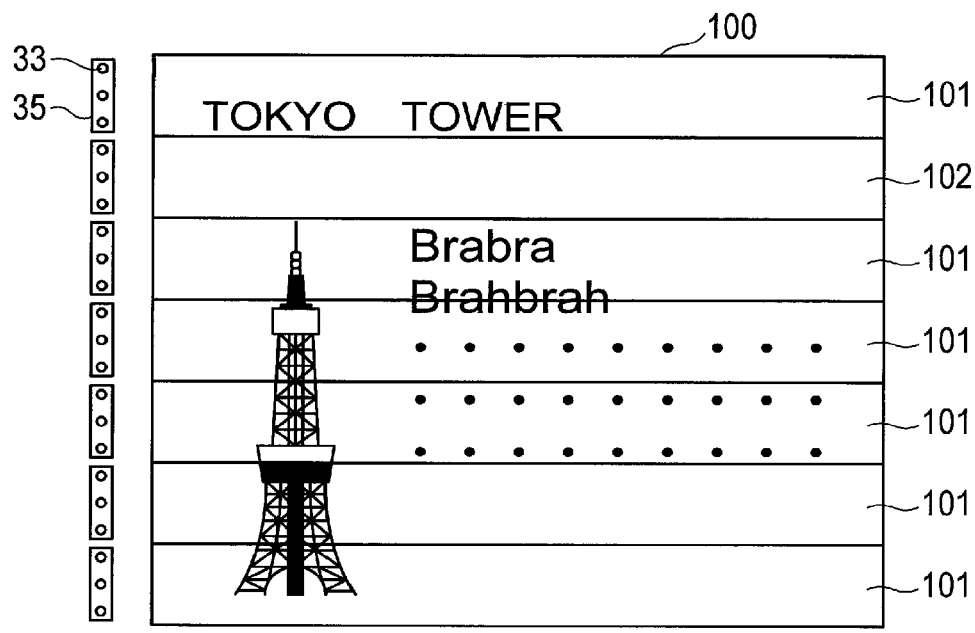
F I G. 15
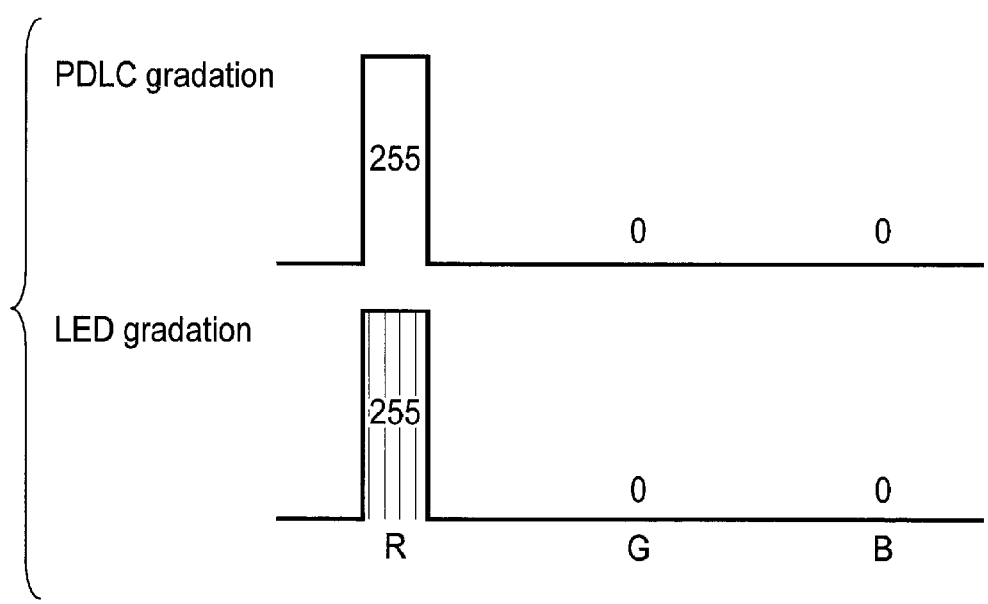
F I G. 16

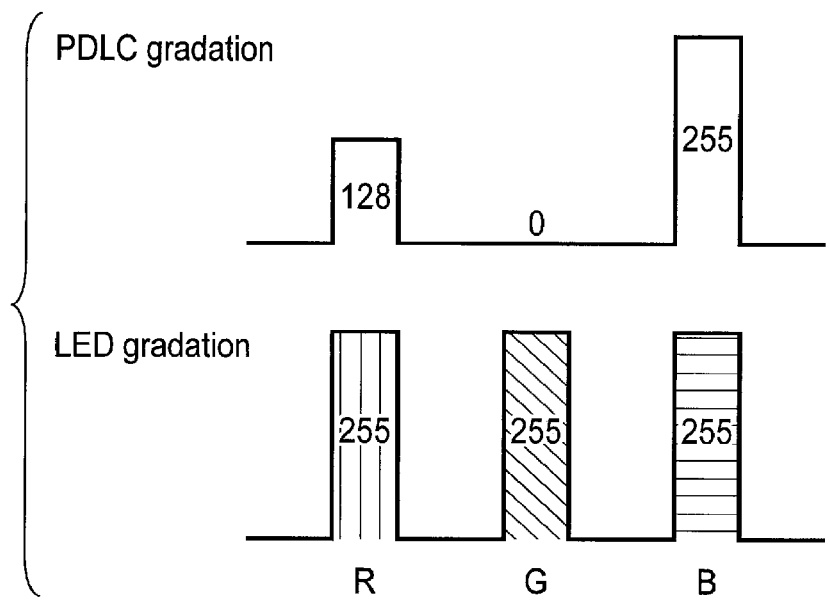
F I G. 20
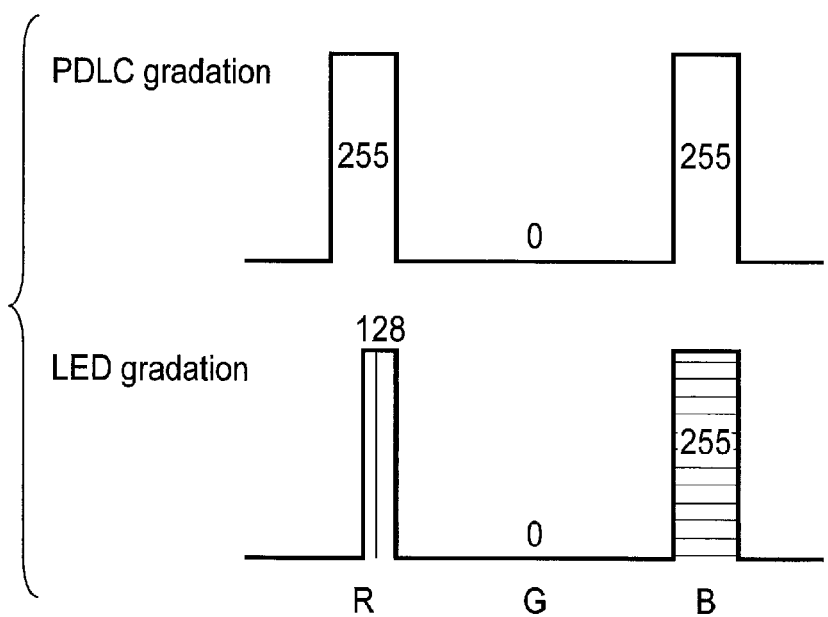
F I G. 21

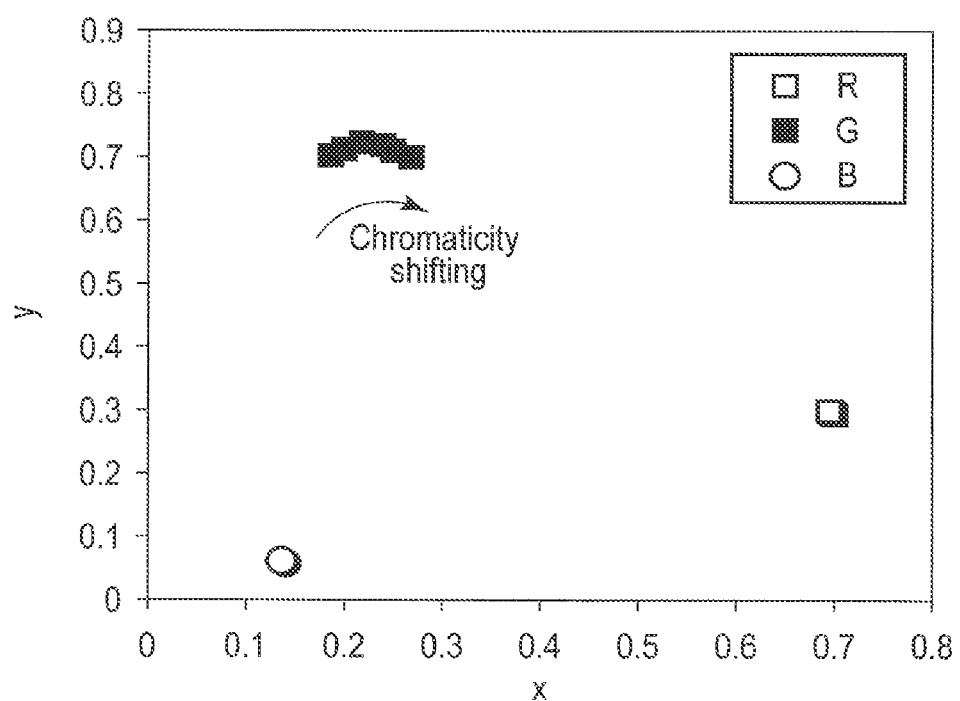
F I G. 25

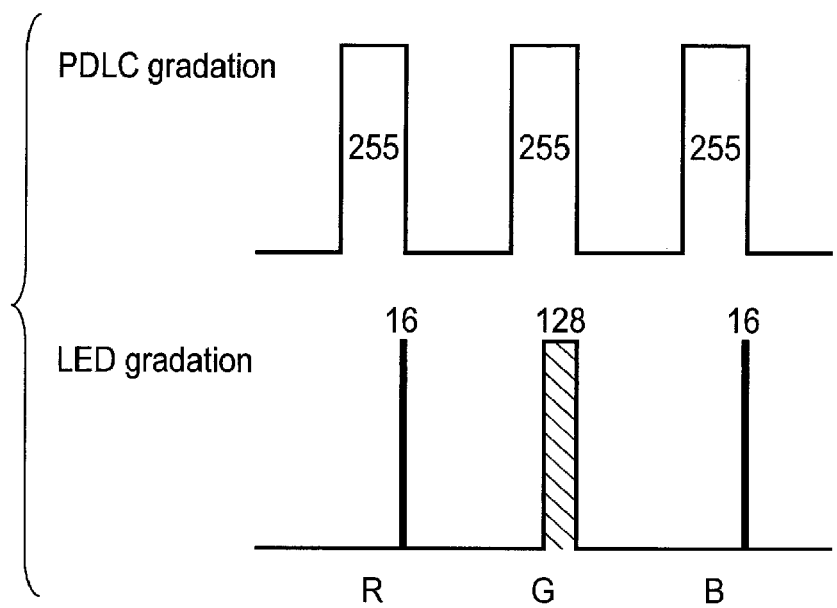
F I G. 30
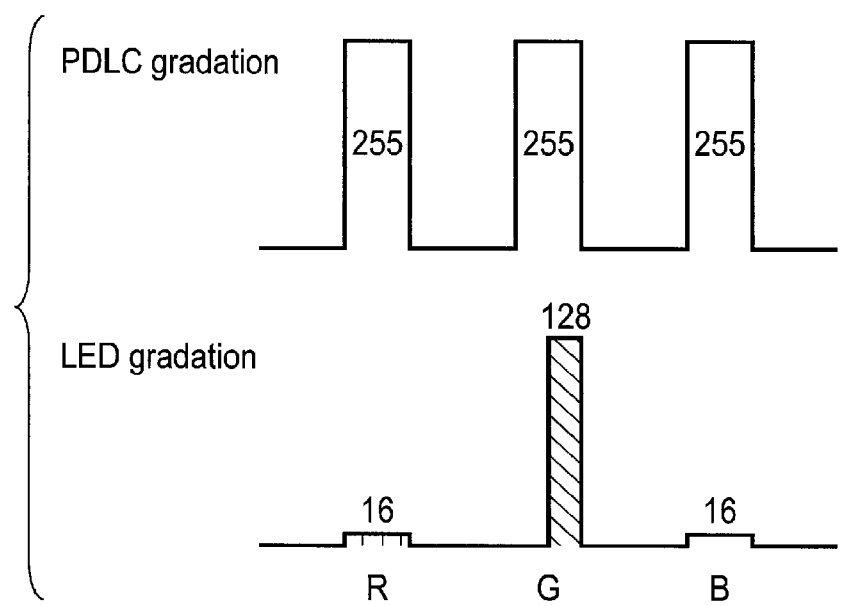
F I G. 31

DISPLAY DEVICE AND CONTROL METHOD OF DISPLAY DEVICE

CROSS-REFERENCE TO RELATED APPLICATIONS

This application is based upon and claims the benefit of priority from Japanese Patent Application No. 2017-246868, filed Dec. 22, 2017, the entire contents of which are incorporated herein by reference.

FIELD

Embodiments described herein relate generally to a display device and a control method of a display device.

BACKGROUND

Conventionally, liquid crystal display devices for displaying a color image include a color filter therein whereas the color filter may decrease transmissivity.

In consideration of this point, a drive method which achieves color display by switching light sources of red, green, and blue of each pixel in a time division manner (hereinafter referred to as field sequential drive method) is known. In this field sequential drive method, a color filter is not necessary, and thus, the transmissivity of liquid crystal display device can be improved.

However, in the above-mentioned field sequential drive method, light sources of different colors are turned on in a time division manner, and thus, for example, even if a signal color of red is displayed, light from the light sources of other colors such as green and blue affects the red color image. Thus, the color gamut may be narrowed in the field sequential drive method.

BRIEF DESCRIPTION OF THE DRAWINGS

FIG. 1 is a schematic view of an example of the structure of a display device of an embodiment.

FIG. 2 shows an example of a cross-section of a display panel.

FIG. 3 shows a function of a light modulation layer.

FIG. 4 shows a function of the light modulation layer.

FIG. 5 shows an example of the structure of a light source.

FIG. 6 shows an example of arrangement of a first electrode and a second electrode.

FIG. 9 shows a state where light incident on a light modulation layer is dispersed.

FIG. 10 shows a state where light introduced into a transparent substrate is dispersed.

FIG. 11 shows an example of light spectrum emitted from a display cell when red is displayed in a field sequential drive method.

FIG. 14 is a flowchart of an example of a process performed by an image signal processing circuit.

FIG. 15 shows an example of an image displayed by the display device.

FIG. 16 shows a relationship between intensity and lighting time of a red light source and an applied voltage when R component of maximum gradation is displayed.

FIG. 20 shows a relationship between the intensity and lighting time of each spotted light source and an applied voltage when violet is displayed in a display cell in the field sequential drive method as a comparative example.

FIG. 21 shows a relationship between the intensity and lighting time of each spotted light source and the applied voltage when violet is displayed in the display cell in the display device of the present embodiment.

FIG. 25 shows transition of chromaticity of each color component when the intensity of each spotted light source is changed.

FIG. 30 shows a relationship between the intensity and lighting time of each spotted light source and the applied voltage when R=16, G=128, and B=16 are displayed in the display cell.

FIG. 31 shows an example where a PWM value control and a current value control are combined and used.

DETAILED DESCRIPTION

Figure 7:
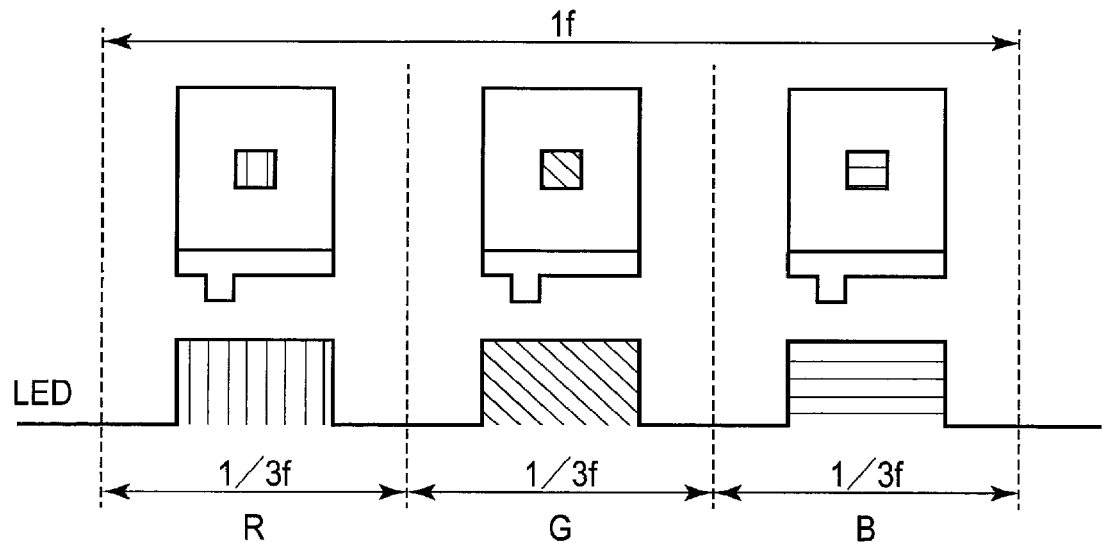
FIG. 7 is a diagram for explanation of a field sequential drive method.

In general, according to one embodiment, a display device including a plurality of light sources of different luminous colors, a first substrate, a second substrate opposed to the first substrate, a liquid crystal layer interposed between the first and second substrates, to which light from the light sources enters, a display area on which an image is displayed, and a drive circuit configured to control quantity of light from each of the light sources on the basis of an analyzation result of an image signal used to display the image.

Hereinafter, embodiments will be explained with reference to accompanying drawings.

FIG. 1 is a schematic view of an example of the structure of a display device of the present embodiment. FIG. 1 shows a display device 10 including a display panel 20, light source 30, and drive circuit 40 which drives the display panel 20 and the light source 30.

The display device 10 of the present embodiment is a liquid crystal display device of high transmissivity (transparent display). The display device 10 includes a light modulation layer including, for example, a polymer dispersed liquid crystal (PDLC) and can display an image by the light emitted from the light modulation layer. This point will be detailed later.

In the following description, the side surface of the display panel 20 to which light from the light source 30 enters will be referred to as light incident surface 20A. In other words, the light incident surface 20A is a surface illuminated by the light source 30. Furthermore, the upper surface of the display panel 20 from which light emits when an image is displayed will be referred to as a light emitting surface 20B.

FIG. 2 shows an example of a cross-section of the display panel 20 of FIG. 1. As shown in FIG. 2, the display panel 20 includes a first substrate SUB1, second substrate SUB2, and light modulation layer 24 interposed between the first substrate SUB1 and the second substrate SUB2. The first substrate SUB1 includes, toward the light modulation layer 24, a transparent substrate 21, first electrode 22, and alignment film 23 in this order. The second substrate SUB2 includes, to be apart from the light modulation layer 24, an alignment film 25, second electrode 26, and transparent substrate 27 in this order. Note that, although this is not described in detail, the second substrate SUB2 includes a scan line, signal line orthogonal to the scan line, and switching element disposed in the proximity of the crossing point of the scan line and the signal line, and further includes various insulating films and the like to insulate the lines from each other. Furthermore, the first substrate SUB1 and the second substrate SUB2 do not include a color filter.

The transparent substrate 21 of a pair of the transparent substrates 21 and 27 includes a light emitting surface 20B in the side opposite to the surface where the first electrode 22 is disposed. On the other hand, the transparent substrate 27 is disposed such that the light modulation layer 24 and the like are interposed between the transparent substrates 21 and 27. The transparent substrates 21 and 27 support the light modulation layer 24, and generally, are each formed of a substrate which is transparent to visible light such as a glass plate or a plastic film.

The first electrode 22 of a pair of the first and second electrodes 22 and 26 is disposed on the surface of the transparent substrate 21 in the light modulation layer 24 side and is a single sheet-like electrode formed over the entirety of the surface, for example. The second electrode 26 is disposed on the surface of the transparent substrate 27 in the light modulation layer 24 side and is formed in an islands manner. A plurality of second electrodes 26 are arranged in the display panel 20, and the second electrodes are arranged in a matrix in the X and Y directions. Each of the second electrodes 26 is connected to a switching element which is not described in detail, and is driven by the drive circuit 40. The first electrode 22 and the second electrode 26 are each formed of a transparent conductive material such as indium tin oxide (ITO) or indium zinc oxide (IZO), for example. The transparent conductive material is, preferably, a material which slightly absorbs the visible light. The arrangement of the first and second electrodes 22 and 26 will be described later.

The alignment films 23 and 25 are disposed between the first and second electrodes 22 and 26 and the light modulation layer 24, and are used to align liquid crystals and monomers used in the light modulation layer 24, for example. The alignment film may be a vertical alignment film or a horizontal alignment film, and in the example of FIG. 2, the alignment films 23 and 25 are each formed of a horizontal alignment film. The horizontal alignment film is formed by performing an alignment process with respect to a resin film such as polyimide or polyamide-imide. The alignment process includes, for example, a rubbing process and an optical alignment process. If a plastic film is used as the transparent substrates 21 and 27, in order to suppress deformation of the transparent substrates 21 and 26, a temperature in a sintering process after applying the alignment films 23 and 25 on the surfaces of the transparent substrates 21 and 27 in the manufacturing process should be low. Thus, polyamide-imide which can be formed in a temperature of 100° C. or less is preferable to be used as the alignment films 23 and 25.

Note that, the alignment films 23 and 25 have the function to simply align the liquid crystals and monomers. Furthermore, the liquid crystals and monomers used in the light modulation layer 24 can be aligned by applying an electric field or a magnetic field between the first and second electrodes 22 and 26, for example, and in that case, the alignment films 23 and 25 may not be used. That is, the alignment state of the liquid crystals and the monomers in a voltage applied state can be fixed by applying an electric field or a magnetic field between the first and second electrodes 22 and 26 and polymerizing monomers with ultraviolet. If a voltage is used to align the liquid crystals and monomers, different electrodes may be prepared for alignment and driving, or a liquid crystal material may be a dual-frequency liquid crystal or the like which reverses dielectric anisotropy in accordance with frequency. Furthermore, if a magnetic field is used to align the liquid crystals and monomers, the liquid crystals and the monomers have, preferably, great magnetic susceptibility anisotropy. For example, it is preferable to use a material with great benzene rings suits as the liquid crystals and the monomers.

The light modulation layer 24 is disposed between the transparent substrates 21 and 27. The light modulation layer 24 shows entirely or partly dispersion or transparency with respect to the light from the light source 30 in accordance with the size and orientation of the electric field produced by the first and second electrodes 22 and 26. Specifically, the light modulation layer 24 shows transparency with respect to the light from the light source 30 when a voltage is not applied to the first and second electrodes 22 and 26, and shows dispersion with respect to the light from the light source 30 when a voltage is applied to the first and second electrodes 22 and 26. The light modulation layer 24 is, for example, a complex layer (polymer dispersion liquid crystal layer) including bulk 24A and a plurality of microparticles 24B dispersed in the bulk 24A. The bulk 24A and the microparticles 24B each have optical anisotropy.

The bulk 24A and the microparticles 24B have different response speeds with respect to an electric field. The bulk 24A has, for example, a stripe structure or a porous structure which does not respond to the electric field, or has a stripe structure or a rod-like structure which respond slower than do the microparticles 24B. The bulk 24A is formed of a polymer material obtained by polymerizing low molecule monomers, for example. The bulk 24A is formed by polymerizing a material having alignment and polymerization such as monomer aligned along the alignment direction of the alignment films 23 and 25 with heat and/or light.

On the other hand, the microparticles 24B mainly include liquid crystal materials, for example, and have a sufficiently quicker response speed as compared to that of the bulk 24A. The liquid crystal materials (liquid crystal molecules) included in the microparticles 24B are, for example, rod-like molecules. As the liquid crystal molecules included in the microparticles 24B should have positive dielectric anisotropy. Note that the liquid crystal molecules having positive dielectric anisotropy are referred to as positive liquid crystal. When the bulk 24A has a stripe structure or a rod-like structure, the liquid crystal molecules of the microparticles 24B are aligned to be parallel to the longitudinal direction of the stripe structure or the rod-like structure of the bulk 24A, for example. In that case, the longitudinal direction of the stripe structure or the rod-like structure of the bulk 24A corresponds to the alignment direction.

The monomers having alignment and polymerization to form the bulk 24A are materials having optical anisotropy and polymerizing with liquid crystals, and in the present embodiment, are low molecule monomers cured with ultraviolet, for example. In a state where no voltage is applied, the directions of optical anisotropy of the liquid crystal materials and the polymer materials formed by polymerizing the low molecule monomers should match, and thus, the liquid crystal materials and the low molecule monomers should be aligned in the same direction before the ultraviolet curing process. If the microparticles 24B are formed of liquid crystal materials which are rod-like molecules, the shape of the monomer material used should be rod-like. In consideration of the above, materials having polymerization and liquid-crystallization should be used as the monomer material, and include, for example, at least one functional group selected from a group of acrylate group, methacrylate group, acryloyloxy group, methacryloyloxy group, vinyl ether group, and epoxy group as a polymerizable function group. Such a function group can be polymerized by irradiating ultraviolet, infrared, or electron, or by heating. In order to suppress decrease of alignment degree at the time of ultraviolet irradiation, a liquid crystal material with multifunction group may be added. When the bulk 24A has the above-mentioned stripe structure, a dual-functional liquid crystal monomer is preferably used as the material of the bulk 24A. Furthermore, a single function monomer may be added to the material of the bulk 24A in order to adjust a temperature to indicate liquid-crystallization, or monomer of three or more functions may be added to the material of the bulk 24A in order to increase crosslinking density.

Now, the function of the light modulation layer 24 will be explained briefly with reference to FIGS. 3 and 4.

FIG. 3 shows an outline of the function of the light modulation layer 24 in a state where a certain voltage is not applied to the first electrode 22 and the second electrode 26 (hereinafter may be referred to as no-voltage applied state). The no-voltage applied state is a state where an electric field is not produced in the light modulation layer 24.

Here, in the no-voltage applied state, an optical axis of the bulk 24A and an optical axis of liquid crystal molecules of the microparticles 24B match in the direction and a differential in the refractive indices becomes significantly small in every direction including front direction and diagonal directions. Thus, for example, each of incident light L11 to L13 from the light source 30 entering from the side surface as depicted with dotted lines is not dispersed by the light modulation layer 24 and passes the light modulation layer 24. Furthermore, each of light L21 and L22 passing through the transparent substrate 27, light modulation layer 24, and transparent substrate 21 from the outside of the transparent substrate 27 as depicted with lines with single dots is not dispersed by the light modulation layer 24 and passes the light modulation layer 24 and exits the light emitting surface 20B of the transparent substrate 27. Thus, in the no-voltage applied state, the light modulation layer 24 has high transmissivity.

FIG. 4 shows an outline of the function of the light modulation layer 24 in a state where a certain voltage is applied to the first electrode 22 and the second electrode 26 (hereinafter may be referred to as voltage applied state). The voltage applied state is a state where an electric field is produced in the light modulation layer 24.

Here, in the voltage applied state, an optical axis of the bulk 24A and an optical axis of the microparticle 24B cross, and a differential in the refractive indices becomes great in every direction including front direction and diagonal directions. Thus, high dispersion is obtained in the light modulation layer 24. In that case, each of the light L11 to L13 from the light source 30 is dispersed in the light modulation layer 24, and each of the dispersed light L31 and L32 exits from the light emitting surface 20B of the transparent substrate 21. Thus, for example, when the light emitting surface 20B of the transparent substrate 21 is observed, the dispersed light L31 and L32 can be recognized. Note that, although this is not shown, the dispersed light L31 and L32 can be detected from the transparent substrate 27, and can be recognized from the transparent substrate 27 side.

That is, for example, when the display panel 20 is viewed from the front, light passing the transparent substrate 27, light modulation layer 24, and transparent substrate 21 is recognized in the no-voltage applied state. On the other hand, light from the light source 30 dispersed in and emitted from the light modulation layer 24 is recognized in the voltage applied state.

Note that, in this example, the light modulation layer 24 has a high dispersion performance in the voltage applied state; however, the light modulation layer 24 may have a high dispersion performance in the no-voltage applied state by setting the optical axis of the bulk 24A and the optical axis of the microparticle 24B to match each other in the no-voltage applied state.

Now, the structure of the light source 30 of FIG. 1 will be explained with reference to FIG. 5. The light source 30 includes, for example, a plurality of spotted light sources 33 arranged linearly in the direction Y. Each of the spotted light sources 33 is configured to emit light toward the light incident surface 20A, and is, for example, a light emitting element including a light emitting spot on the surface opposed to the light incident surface 20A. The light emitting element may be an LED or an laser diode (LD), for example.

The spotted light sources 33 may be arranged on the common substrate 34 as groups including a certain number of light sources 33. In that case, one substrate 34 and a plurality of spotted light sources 33 arranged on the substrate 34 form a light source block 35. The substrate 34 is a circuit substrate on which a line to electrically connect, for example, the spotted light sources 33 and the drive circuit 40 is formed, and each spotted light source 33 in the light source block 35 is mounted on the circuit substrate. Although this is not shown, the spotted light sources 33 and substrate 34 forming the light source block 35 and drive circuit 40 are arranged on the second substrate SUB2, for example.

Note that the spotted light sources 33 in the light source block 35 arranged on the common substrate 34 emit different luminous colors. In the example of FIG. 5, three spotted light sources 33 are arranged on one substrate 34, and the three spotted light sources 33 emit red, green, and blue, for example. A drive method of the spotted light sources 33 in each light source block 33, that is, a drive method of the display device 10 when an image is displayed will be detailed later.

FIG. 6 shows an example of the arrangement of the first electrode 22 and the second electrode 26 of FIG. 2. The first electrode 22 and the second electrode 26 are arranged to be opposed to each other with the light modulation layer 24 interposed therebetween. The first electrode 22 has a single sheet-like shape as described above. On the other hand, the second electrodes 26 are shaped as islands and is arranged in a matrix. The second electrodes 26 arranged as above are electrically separated from each other and an independent voltage is applied thereto.

Note that the shapes of the first and second electrodes 22 and 26 are not limited to the above examples. For example, a plurality of first electrodes of band-like shape arranged at certain intervals and a plurality of second electrodes 26 of band-like shape arranged at certain intervals may be disposed to cross each other.

Now, the operation of the display device 10 of the present embodiment when an image is displayed will be explained. Note that, in the present embodiment, the image displayed by the display device 10 includes video. The drive circuit 40 sequentially applies a voltage to an electrode which produces an electric field to the light modulation layer 24 corresponding to an area as a display unit which is divided from the display area of the display panel 20 (hereinafter referred to as display cell), for example. Note that the display cell corresponds to an area where the first electrode 22 and one second electrode 26 are opposed to each other with the light modulation layer 24 interposed therebetween.

In the present embodiment, as a drive method of the display device 10 when an image is displayed on the basis of the image signal, a field sequential drive method is adopted. Note that the field sequential drive method may be referred to as field sequential color method.

In the field sequential drive method, one frame period in which an image is displayed on the basis of image signals includes a first light period in which a red spotted light source 33 is lit, second light period in which a green spotted light source 33 is lit, and third light period in which a blue spotted light source 33 is lit. In this example, as shown in FIG. 7, the first to third light periods each correspond to ⅓f which does not overlap with each other, and the red, green, and blue spotted light sources 33 are lit separately in the first to third light periods. Note that, in FIG. 7, one frame period is 1f, first light period in which the red spotted light source 33 is lit is R, second light period in which the green spotted light source 33 is lit is G, and third light period in which the blue spotted light source 333 is lit is B.

Here, the drive circuit 40 described above sequentially applies a voltage corresponding to an image signal of each of red, green, and blue with respect to the first electrode 22 and the second electrode 26 of one display cell during the first to third light periods in a time division manner.

Specifically, for example, when the spotted light source 33 which emits red (hereinafter referred to as red light source) in the first light period is lit, red incident light from the red light source 33 enters the area of the light modulation layer 24 corresponding to the display cell. Then, when a voltage is applied to the first electrode 22 and the second electrode 26 corresponding to the display cell, the area of the light modulation layer 24 corresponding to the display cell becomes a dispersed state, and the dispersed light of red incident light exits.

In this example, the light form the red light source 33 is incident in the first light period, and the same applies to cases where light from the spotted light sources 33 which emit green and blue (hereinafter referred to as green light source and blue light source, respectively) in the second and third light periods.

In the field sequential drive method, as described above, the spotted light sources 33 of the same color in each light source block 35 are lit at the same time in the light source 30, voltages are sequentially applied to the electrodes corresponding to each display cell in the display area, and then, the spotted light sources 33 in each light source block 35 are switched at the same time, that is, the light color of the light source 30 is switched at the same time. This process is repeated.

In this field sequential drive method, a plurality of spotted light sources 33 of different luminous color are sequentially lit in a time division manner on the basis of the control by the drive circuit to sequentially emit the light of red component, light of green component, and light of blue component from the light modulation layer 24. Thus, an image can be color-displayed on the basis of the image signals.

Note that, if all color components of the image signals are 0, the first electrode 22 and the second electrode 26 corresponding to a display cell are not driven, and a transparent state of the display cell is recognized.

In the above description, the color components included in image signals are red, green, and blue components; however, the color components may be cyan, magenta, and yellow. In that case, a combination of the green light source 33 and the blue light source 33, combination of the red light source 33 and the blue light source 33, combination of the red light source 33 and the green light source 33 may be lit at the same time, respectively.

Furthermore, the color emitted by each spotted light source 33 in the light source 30, or combination of colors emitted by the spotted light sources 33 in a case where several spotted light sources 33 are lit at the same time may be changed arbitrarily.

As described above, in the present embodiment, an image on the basis of the image signals is color-displayed, when light from the light source 30 enters the light modulation layer 24 and is emitted from the light modulation layer 24 as dispersed light. In other words, in the display device 10 of the present embodiment, light from the light source 30 entering the light modulation layer 24 is selectively dispersed to display an image.

Figure 8:
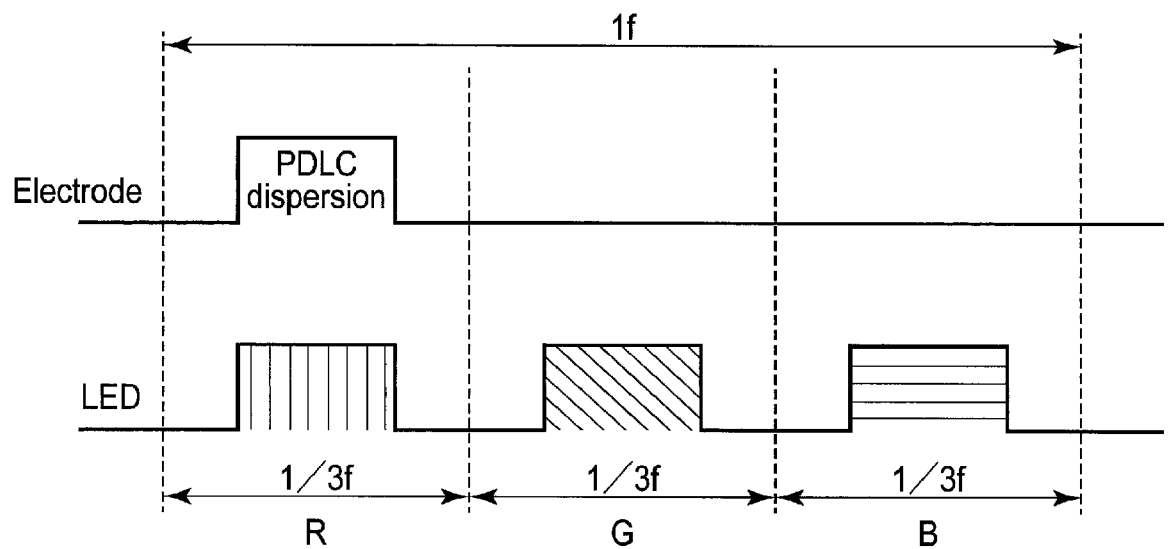
FIG. 8 shows a relationship between a light state of each spotted light source and a voltage applied to electrodes when red is displayed in a display cell.

Here, a case where red is displayed in a certain display cell (hereinafter referred to as target display cell) in the field sequential drive method is considered. In that case, as shown in FIG. 8, the red, green, and blue spotted light sources 33 emitting light to the light modulation layer 24 corresponding to the target display cell sequentially emit light at corresponding ⅓f.

Furthermore, if red is displayed in the target display cell as above, in a period in which the red spotted light source 33 is lit, that is, in the first light period, a voltage is applied to the first electrode 22 and the second electrode 26 corresponding to the target display cell. On the other hand, in periods in which the green and blue are lit, that is, in the second and third light periods, a voltage is not applied to the first electrode 22 or the second electrode 26 corresponding to the target display cell. Through this process, red dispersed light is emitted from the light modulation layer 24 corresponding to the target display cell in the first light period while green dispersed light and blue dispersed light are not emitted from the area of the light modulation layer 24 corresponding to the target display cell in the second and third light periods. Thus, red can be displayed in the target display cell.

Now, if a voltage is applied to the first electrode 22 and the second electrode 26 corresponding to the target display cell, for example, as shown in FIG. 9, dispersed light is emitted from the area of the light modulation layer 24 corresponding to the target display cell. On the other hand, if a voltage is not applied to the first electrode 22 and the second electrode 26 corresponding to the target display cell, light toward the transparent substrate 21 or 27 should be, ideally, entirely reflected and is not emitted outside. However, as shown in FIG. 10, light toward the transparent substrate 21 or 27 (glass) is slightly dispersed in reality.

That is, even if red is displayed in the target display cell as described above, dispersed light from the green light source 33 and the blue light source 33 is slightly detected, and thus, displayed red color of the red light source 33 slightly contains green and blue components.

Note that, in FIG. 11, an example of light spectrum emitted from the target display cell when red is displayed in the field sequential drive method is shown. In FIG. 11, R is red component, G is green component, and B is blue component. In the example of FIG. 11, light intensity of wavelength corresponding to the red component is highest while light of wavelength corresponding to each of the green component and the blue component is included in the light emitted from the target display cell.

In this example, red is displayed; however, the same applies to a case where any other color such as green or blue is displayed.

Figure 12:
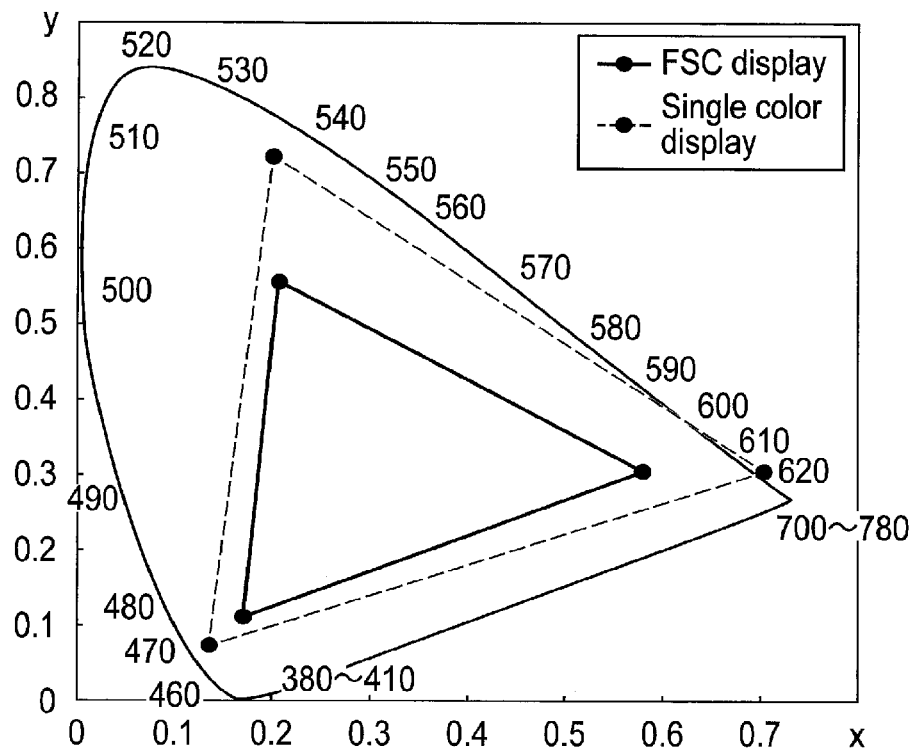
FIG. 12 shows a color gamut in the field sequential drive method.

In the field sequential drive method (FCS display), color components of colors other than the color to be displayed on the basis of image signals leak out through the glass. Because of the color components of the colors other than the color to be displayed, as shown in an xy chromaticity diagram of FIG. 12, the color gamut is narrowed as compared to a case where a single color display is performed with a single color spotted light source 33, that is, one of the red, green, and blue light sources 33.

Thus, the display device 10 of the present embodiment includes a structure to control the quantity of light of each of the spotted light sources 33 to suppress narrowing the color gamut when an image is displayed in the field sequential drive method.

Figure 13:
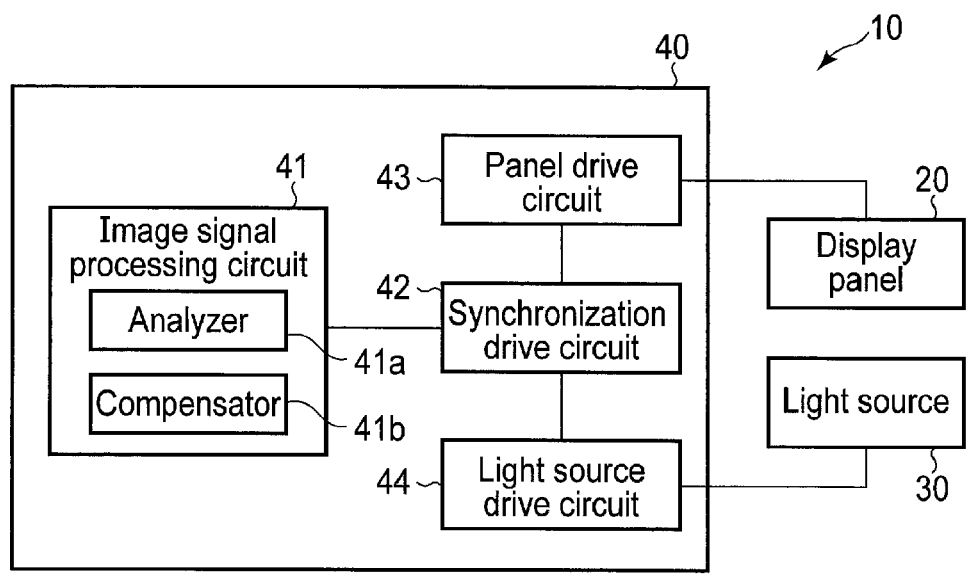
FIG. 13 shows an example of the structure of a drive circuit.

FIG. 13 mainly shows an example of the structure of the drive circuit 40 of FIG. 1. As shown in FIG. 13, the drive circuit 40 includes an image signal processing circuit 41, synchronization drive circuit 42, panel drive circuit 43, and light source drive circuit 44, for example. Note that, in the present embodiment, the circuits 41 to 44 are included in the drive circuit 40; however, the image signal processing circuit 41 may be provided outside the drive circuit 40, for example.

The image signal processing circuit 41 acquires image signals input to the display device 10. In the image signals, color data corresponding to the display area of the display panel 20 are set, for example. The image signals include signal values of red, green, and blue components in each display cell described above. That is, the image signals acquired by the image signal processing circuit 41 are the signals for color display of image.

The image signal processing circuit 41 includes an analyzer (analyzation circuit) 41a and a compensator (compensation circuit) 41b. The analyzer 41a analyzes image signals to acquire color data to be displayed on the basis of the image signals. The color data are signal values of each color component of each display cell included in the image signals.

The compensator 41b compensates (controls) the quantity of light of each spotted light source 33 on the basis of the signal values of each color component of each display cell acquired by the analyzer 41a.

The synchronization drive circuit 42 acquires the image signals from the image signal processing circuit 41, and drives the panel drive circuit 43 and the light source drive circuit 44 in synchronization. Specifically, the synchronization drive circuit 42 synchronizes the drive of the first electrode 22 and the second electrode 26 by the panel drive circuit 43 with respect to the display cell and entering of the light from the light source 30 by the light source drive circuit 44

The synchronization drive circuit 42 includes, although this is omitted from FIG. 13, a timing generator, display cell drive signal generator, and light source drive signal generator as function structures.

The timing generator generates synchronization signals to synchronize the operation timing of the panel drive circuit 43 and the light source drive circuit 44. The synchronization signals generated by the timing generator are output to the panel drive circuit 43 and the light source drive circuit 44.

The display cell drive signal generator generates display cell drive signals to drive the electrodes corresponding to the display cell on the basis of the image signals output by the image signal processing circuit 41, and outputs the display cell drive signals and the synchronization signals to the panel drive circuit 43. Drive values (voltage values) corresponding to the red, green, and blue components corresponding to the image signals are set in the display cell drive signals.

The light source drive signal generator generates light source drive signals to drive the red, green, and blue light sources 33 corresponding to the display cell, and outputs the light source drive signals to the light source drive circuit 44. Note that the light source drive signals include signals to illuminate each spotted light source 33 with the quantity of light compensated by the compensator 41b.

The panel drive circuit 43 and the source drive circuit 44 are driven in synchronization in accordance with the synchronization signals output by the timing generator of the synchronization drive circuit 42. In that case, for example, in synchronization with the illumination of red light source 33 on the basis of the light source drive signals by the light source drive circuit 44, the panel drive circuit 44 applies a voltage to the electrodes corresponding to the display cell which is a target of the display cell drive signals. Thus, red dispersed light is emitted from the display cell which is a target of the display cell drive signals. In this example, red is explained; however, the same applies to the other colors.

Since the above-described synchronization drive of the panel drive circuit 43 and the light source drive circuit 44 is performed, display of red, green, and blue components of image signals is achieved in a display cell.

(PWM Value Control)

Now, an example of process of the image signal processing circuit 41 of FIG. 13 will be explained with reference to a flowchart of FIG. 14.

Note that, in the present embodiment, the quantity of light of each spotted light source 33 is controlled; however, the control of the quantity of light of the spotted light sources 33 may be achieved by modulating a pulse width of the voltage applied to the spotted light sources 33 (pulse width modulation (PWM)) to control the lighting time of the spotted light source 33, or may be achieved by modulating a current supplied to the spotted light sources 33 to control intensity (signal level) of the spotted light sources 33.

In the following description, controlling of the quantity of light of each spotted light source 33 is achieved by controlling of the lighting time of the spotted light source 33, that is, by controlling a PWM value of the spotted light source 33.

Note that, image signals are input in the display device 10 in accordance with a certain frame rate, and the process of FIG. 13 is performed at each time when the image signals are input in the display device 10. Note that the image signals are input to the display device 10 from a host device connected to the drive circuit 40 via a flexible printed circuit, for example. The image signals may be input from an external device other than the host device.

Initially, the image signal processing circuit 41 acquires the image signals input in the display device 10 as described above (step S1). The image signals are used for color display of image, and includes signal values of color components including red, green, and blue components of each display cell (hereinafter referred to as signal values of RGB components).

Then, the analyzer 41a included in the image signal processing circuit 41 analyzes the image signals acquired in step S1 and acquires signal values of RGB components from the image signals (step S2). In that case, the analyzer 41a defines an area in which a character, figure, or the like is displayed in the display area and an area in which the character, figure, or the like is not displayed.

Here, in the display device 10 of the present embodiment, a lighting time of each spotted light source 33, that is, a pulse width of a voltage applied to each spotted light source 33 is preset in accordance with the spec of the display panel 20 of the display panel 10 or the like. Note that the lighting time of each spotted light source 33 is a value to control the quantity of light of the spotted light source 33, and may be arbitrarily changed on the basis of the drive mode of the display device 10 or the like. Note that the drive mode of the display device 10 includes a frame rate or the like.

The compensator 41b reads the lighting time of each spotted light source 33 (step S3).

The compensator 41b performs a process to compensate the lighting time (hereinafter referred to as compensation process) on the basis of the signal values of RGB components read in step S2 and the lighting time of the spotted light sources read in step S3 (step S4). Note that the compensation process of step S4 will be detailed later.

When step S4 is performed, the compensator 41b outputs the image signals acquired in step S1 and the lighting time compensated in step S4 to the synchronization drive circuit 42 (step S5).

In that case, the light source drive circuit 44 is driven to illuminate each spotted light source 33 corresponding to the lighting time output in step S5, and the panel drive circuit 43 is driven to apply a voltage to the electrodes corresponding to the display cell which displays the color of light of the spotted light source 33, on the basis of the synchronization signals generated by the synchronization drive circuit 42.

In this process, the quantity of light of each spotted light source 33 is controlled on the basis of the signal values of RGB components as a result of analyzation of the image signals to decrease the effect of light of color components other than the color component to be displayed on the basis of the image signals.

Hereinafter, the compensation process of step S4 shown in FIG. 14 will be explained. Initially, the display device 10 of the present embodiment has high transmissivity, and thus, for example, the display device 10 may be used to overlap a background while an image including characters, simple figures, drawings, and the like is displayed with a single color such as red as shown in FIG. 15. In FIG. 15, for better understanding, the spotted light sources 33 and the light source blocks 35 are simplified.

Now, the image of FIG. 15 is displayed, the display area 100 of the display device 10 includes an area 101 where the characters and the figures are displayed in, for example, red and an area 102 where the characters and the figures are not displayed. In the present embodiment, an area to display an image by illuminating the spotted light sources 33 is assigned to each light source block 35 of FIG. 5. The areas 101 and 102 include an area assigned to each of the light source block 35 as a unit, and for example, as shown in FIG. 15, the area extends in a direction of the light incident from the light source block 35. That is, in the area assigned to each light source block 35, an area which includes at least one display cell which displays characters or figures is the area 101, and an area which does not include a display cell which displays characters or figures is the area 102.

Note that the area 101 and the area 102 can be identified on the basis of the signal values of RGB components corresponding to each display cell included in the image signals. The signal values of RGB components include values of each component represented in the gradation of RGB color model of 0 to 255. Here, the signal values of RGB components corresponding to a display cell which displays red (pixel) are, for example, R=255 (maximum gradation), G=0 (minimum gradation), and B=0 (minimum gradation).

Note that, when red of maximum gradation is displayed in a target display cell, for example, as shown in FIG. 16, the red light source 33 is illuminated with the maximum light emitting intensity for a certain period of time, and a voltage which sufficiently disperses light incident on the light modulation layer 24 by the illumination of the red light source 33 during the illumination of the red light source 33. In FIG. 16, the horizontal axis in the upper part indicates a period of time in which a voltage is applied to the electrodes corresponding to a target display cell and the vertical axis in the upper part indicates a voltage value applied to the electrodes. Furthermore, in FIG. 16, the horizontal axis in the lower part indicates a lighting time of each of the red, green, and blue light sources 33, and the vertical axis in the lower part indicates the intensity of each spotted light source 33. The same applies to the figures similar to FIG. 16.

In this example, red of the maximum gradation is displayed; however, the same applies to green and blue, for example. In the following description, the intensity and the lighting time of the spotted light sources 33 when each color of maximum gradation is displayed will be referred to as the intensity and lighting time corresponding to the maximum gradation. Similarly, the voltage applied to the electrodes when each color of maximum gradation is displayed (hereinafter referred to as applied voltage) will be referred to as applied voltage corresponding to the maximum gradation.

Note that, in FIG. 16, the gradation adjusted by the intensity and the lighting time of each spotted light source 33 is LED gradation, and the gradation adjusted by the applied voltage is PDLC gradation.

Now, the compensation process is explained again. If the image of FIG. 15 is displayed in red as described above, the lighting time of the red light source 33 which emits red light into the light modulation layer 24 corresponding to each display cell corresponding to the area 101 is not necessary to be changed from the lighting time corresponding to the maximum gradation. On the other hand, the image of FIG. 15 is displayed with red only, and thus, light of green and blue is not incident upon the light modulation layer 24 corresponding to each display cell corresponding to the area 101. Thus, the lighting time of each of the green and blue light sources 33 emitting light to the light modulation layer 24 corresponding to the area 101 is adjusted such that the quantity of light of the green and blue light sources 33 becomes minimum, that is, 0. In other words, a spotted light source 33 corresponding to the color which is not used in the image display is not illuminated.

Furthermore, the area 102 is an area which does not display characters or figures. Thus, light of red, green, and blue is not necessary to be incident on the light modulation layer 24 corresponding to each display cell corresponding to the area 102. Thus, the lighting time of each spotted light source 33 which emits light to the area 102 is adjusted such that the quantity of light of each spotted light source 33 becomes minimum, that is, 0.

Now, a case where an image depicted in FIG. 15 is displayed in a mixed color is considered. In this example, the image is displayed in violet (magenta), and the signal values of RGB components included in the image signals used to display the image, that is, the signal values of RGB components corresponding to the display cell displaying violet are, for example, R=128, G=0, and B=255.

Here, in order to display the image of FIG. 15 in violet, red light corresponding to R component (R=128) of the signal values of RGB components need to be emitted from the light modulation layer 24 corresponding to each display cell corresponding to the area 101.

Figure 17:
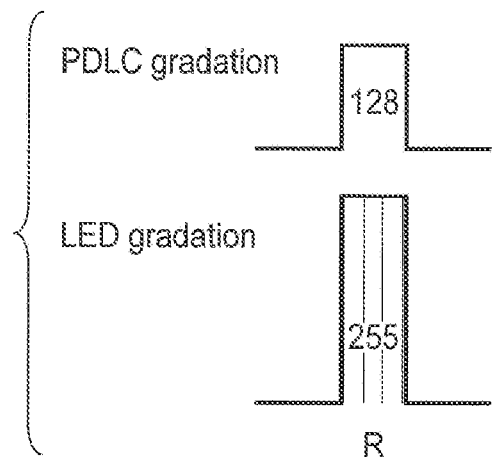
FIG. 17 shows a case where gradation of R component is represented in a field sequential drive method as a comparative example.

In that case, for example, in a field sequential drive method as a comparative example shown in FIG. 17, the red light source 33 is illuminated with the intensity and lighting time corresponding to the maximum gradation and an applied voltage is lowered than the applied voltage corresponding to the maximum gradation. Thus, the quantity of light emitted from the light modulation layer 24 is adjusted and gradation of R components displayed in the target display cell which is R=128 is achieved.

Figure 18:
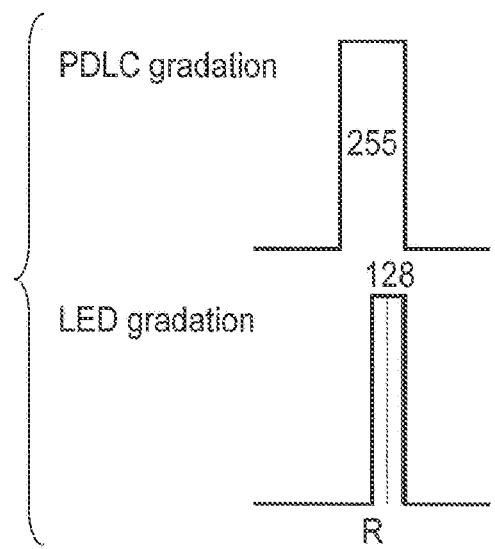
FIG. 18 shows a case where gradation of R component is displayed in a display cell in a lighting time of the red light source.

In contrast, in the display device 10 of the present embodiment, as shown in FIG. 18, the intensity of red light source 33 is the same as the intensity corresponding to the maximum gradation while the lighting time of the red light source 33 is shortened than the lighting time corresponding to the maximum gradation. Controlling of the lighting time modulates a pulse width of the voltage applied to the red light source 33 as described above. That is, this controlling is achieved by controlling PWM of the red light source 33. Thus, in the present embodiment, the lighting time may be referred to as PWM value. Note that the applied voltage is the same as the applied voltage corresponding to the maximum gradation.

That is, in the field sequential drive method explained as the above comparative example, the lighting time read in step S3 of FIG. 14 is the lighting time corresponding to the maximum gradation, and in the present embodiment, the lighting time corresponding to the maximum gradation is changed instead of the applied voltage to achieve the gradation of each color component displayed in the display cell.

Specifically, in a state where the applied voltage corresponding to the maximum gradation is applied to the electrodes corresponding to the target display cell, when the lighting time of LED used in each spotted light source 33 is ½, the gradation of each color component displayed in the target display cell (brightness) can be ½. Thus, if R=128 in the signal values of RGB components included in the image signals, the lighting time of the red light source 33 is adjusted to be ½ of the lighting time corresponding to the maximum gradation. When the above-explained ⅓f is considered as the lighting time corresponding to the maximum gradation, the lighting time of the red light source 33 is ⅙f.

Note that, when Duty=100 means a lighting time corresponding to 255 gradation as the maximum gradation, Duty will be represented as Duty=100*X/255 where the gradation is X. That is, if R=128, Duty≈50.

Figure 19:
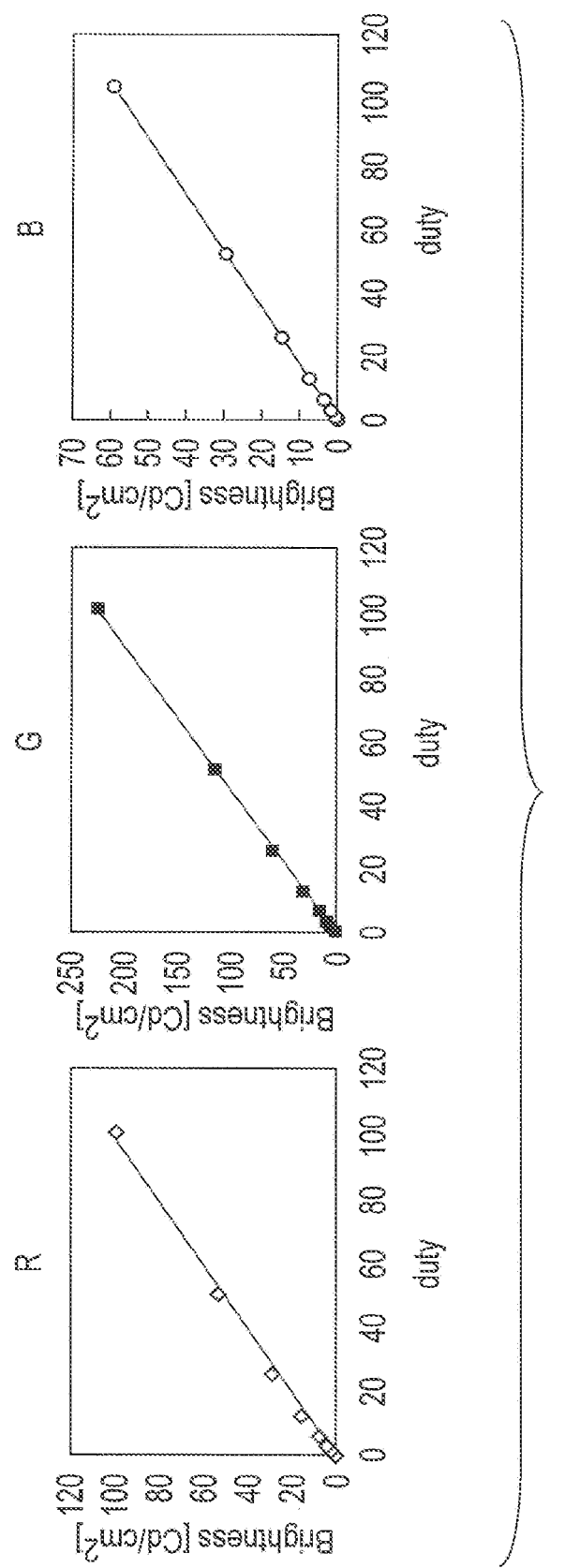
FIG. 19 shows a relationship between Duty and brightness of each color component displayed in a display cell.

FIG. 19 shows a relationship between the Duty and the brightness (gradation) of red (R), green (G), and blue (B) displayed in a target display cell. As shown in FIG. 19, the relationship between Duty and the brightness is, in each of red, green, and blue, approximately linear. Thus, in the present embodiment, the gradation of each color component displayed in the target display cell is achieved by controlling the quantity of light of each spotted light source 33 on the basis of the lighting time.

On the other hand, the image shown in FIG. 15 is displayed in violet which is a mixed color of red and blue, and thus, green light is not necessary to be illuminated to the light modulation layer 24 corresponding to the area 101. Thus, the lighting time of the green light source 33 which illuminates light to the light modulation layer 24 corresponding to the area 101 is adjusted such that the quantity of light of the green light source 33 becomes minimum, that is, 0. That is, in that case, the green light source 33 is not illuminated. In that case, a voltage is not applied to the electrodes corresponding to the target display cell.

Furthermore, in order to display the image shown in FIG. 15 in violet, blue light corresponding to B component (B=255) of RGB components need to be emitted from the light modulation layer 24 corresponding to the area 101. In that case, the lighting time of the blue light source 33 is not necessary to be changed from the lighting time corresponding to the maximum gradation.

As explained above, in the display device 10 of the present embodiment, the gradation of each color component used to display an image is achieved by adjusting the lighting time of each spotted light source 33 and controlling the quantity of light of each spotted light source 33.

Note that FIG. 20 shows a relationship between the intensity and lighting time (LED gradation) of each spotted light source 33 and an applied voltage (PDLC gradation) when violet (R=128, G=0, and B=255) is displayed in the target display cell in the field sequential drive method explained above as the comparative example. FIG. 21 shows a relationship between the intensity and lighting time of each spotted light source 33 and the applied voltage when violet is displayed in the target display cell in the display device 10 of the present embodiment.

In the present embodiment, since the gradation of each color component displayed in the target display cell in the lighting time of each spotted light source 33 is achieved as shown in FIG. 21, as compared to the comparative example of FIG. 20, the quantity of light of the red and green light sources 33 can be reduced.

Figure 22:
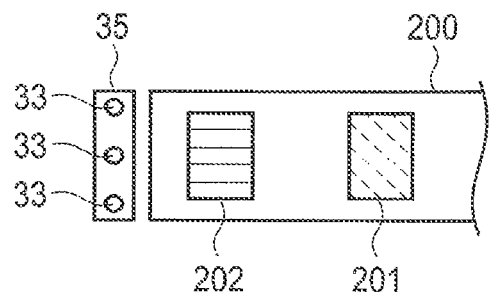
FIG. 22 shows an example of a display area assigned to a light source block.

Here, FIG. 22 shows a partial area 200 of the display area assigned to one light source block 35. In this example, the area 201 in the area 200 indicates an area (display cell) in which violet is displayed on the basis of the signal values of RGB components of R=128, G=0, and B=255, for example, in the area 200. On the other hand, the area 202 indicates an area in which blue is displayed on the basis of the signal values of RGB components of R=0, G=0, and B=255, for example, in the area 101.

In that case, in the area 201, in either the case where the gradation of each color component to be displayed by the applied voltage is represented as shown in FIG. 20, or the case where the gradation of each color component to be displayed by the lighting time is represented as shown in FIG. 21, violet can be displayed.

However, in the field sequential drive method which represents the gradation of each color component to be displayed by the applied voltage as in the above comparative example, the quantity of light itself of each spotted light source 33 is high, and thus, the quantity of light leaked from the glass is great. Thus, although blue (single color) need to be displayed in the area 202, the color detected in the area 202 includes red and green other than the luminous color of blue light source.

In contrast, in the display device 10 of the present embodiment in which the gradation of each color component is displayed in the lighting time, the quantity of light of each spotted light source 33 is less than that of the comparative example, and thus, the quantity of light leaked from the glass becomes less and the effect thereof becomes less as well. Thus, in the area 202, blue close to the luminous color of the blue light source 33 can be displayed.

In this example, cases where the gradation of each color component is achieved by the lighting time of each spotted light source 33 are explained. However, the control of the quantity of light of each spotted light source 33 may be achieved by controlling the intensity of each spotted light source 33 as described above. Note that the control of the intensity of each spotted light source 33 is achieved by modulating the current supplied to the spotted light source 33, that is, by controlling current values of the spotted light source 33.

(Current Value Control)

Hereinafter, the control of the quantity of light of each spotted light source 33 is performed by controlling the intensity of the spotted light source 33, that is, by controlling the current value of the spotted light source 33. Note that, in the following description, performing the control of the quantity of light of each spotted light source 33 by controlling the current value of the spotted light source 33 will be referred to as current value control.

In this example, the image shown in FIG. 15 is displayed in violet as described above. In that case, the signal values of RGB components included in the image signals are, as described above, R=128, G=0, and B=255.

Figure 23:
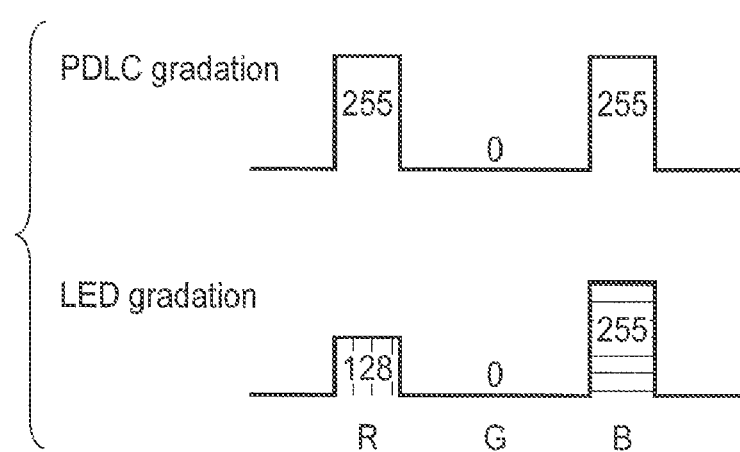
FIG. 23 shows a relationship between the intensity and lighting time of each spotted light source and the applied voltage when violet is displayed in the display cell in the current value control.

In that case, red light corresponding to the R component (R=128) of the signal values of RGB components need to be detected from the light modulation layer 24 corresponding to the area 101. Thus, in the above-mentioned current value control, as shown in FIG. 23, the lighting time of the red light source 33 is the same as the lighting time corresponding to the maximum gradation while the intensity of the red light source 33 is set to be less than the intensity corresponding to the maximum gradation. Note that the applied voltage is the same as the applied voltage corresponding to the maximum gradation.

That is, in the current value control, the intensity corresponding to the maximum gradation (current value) is read in step S3 of FIG. 14, and the intensity corresponding to the read maximum gradation is adjusted to present the gradation of each color component displayed in the target display cell.

Figure 24:
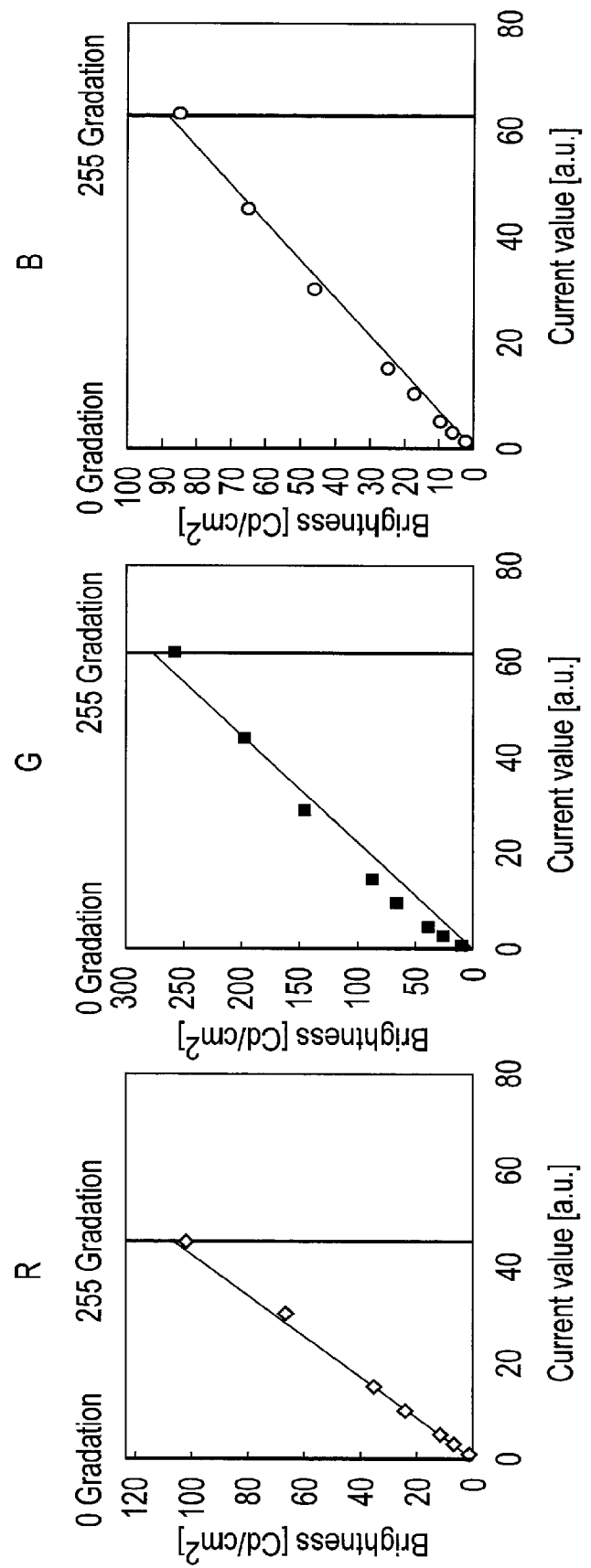
FIG. 24 shows a relationship between a current value supplied to each spotted light source and brightness of each color displayed in a display cell.

Now, FIG. 24 shows a relationship between the current value supplied to each spotted light source 33 and the brightness (gradation) of red (R), green (G), and blue (B) displayed in the display cell. As shown in FIG. 24, the relationship between the current value and the brightness is approximately linear in each of red, green, and blue. Thus, in the current value control, the gradation of each color component displayed in the display cell can be achieved by controlling the current value supplied to each spotted light source 33.

In this process, for example, when an applied voltage corresponding to the maximum gradation is applied to the electrodes corresponding to a target display cell, if the current value supplied to each spotted light source 33 is ½, the gradation (brightness) of each color component displayed in the target display cell is ½. Note that, in that case, each spotted light source 33 is an LED which has the gradation performance corresponding to an RGB color model. Thus, when, for example, R=128 in the signal values of RGB components included in the image signals, the current value supplied to the red light source 33 is adjusted to be ½ of the current value corresponding to the maximum gradation.

Note that, if violet is displayed in the current value control, the signal level of green light source 33 which emits light into the light modulation layer 24 corresponding to the area 101 is adjusted such that the quantity of light of the green light source 33 becomes minimum, that is, 0. Furthermore, the intensity of the blue light source 33 which emits light into the light modulation layer 24 corresponding to the area 101 is not necessary to be changed from the intensity corresponding to the maximum gradation.

As described above, the quantity of light of each spotted light source 33 may be controlled by adjusting the intensity of the spotted light source 33 in order to achieve the gradation of each color component used for image display.

In that case, as compared to the above-described comparative example of FIG. 20, the quantity of light of the red light source 33 and the green light source 33 can be reduced, and the effect of light leaked from the glass can be suppressed.

Now, FIG. 25 shows transition of chromaticity of red (R), green (G), and blue (B) in a case where the intensity of each spotted light source 33, that is, current value supplied to each spotted light source 33 is changed by the current value control.

Figure 28:
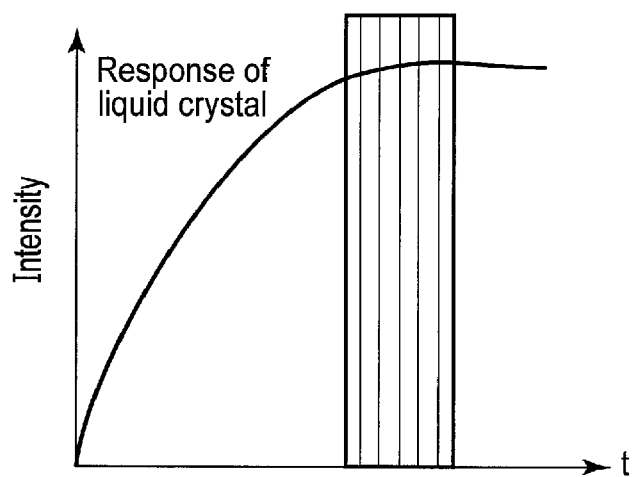
FIG. 28 shows a relationship between a response speed of a light modulation layer and the intensity and lighting time of a spotted light source.

FIG. 25 shows that there is no great shifting in the chromaticity of red even if the current value supplied to the red light source 33 is changed. The same applies to blue. On the other hand, if the current value supplied to the green light source 33 is changed (decreased), the chromaticity is shifted as shown in FIG. 28. In the example shown in FIG. 24, as compared to red and blue, green relatively shows variety with respect to the approximately linear line.

Figure 26:
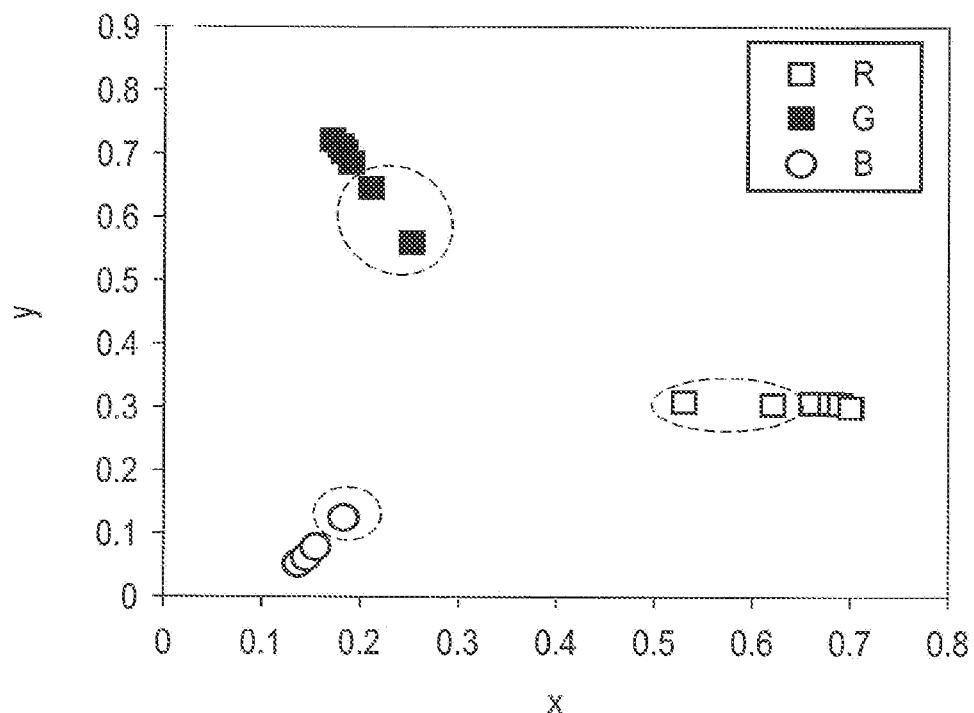
FIG. 26 shows transition of chromaticity of each color component when the lighting time of each spotted light source is changed.

On the other hand, FIG. 26 shows the transition of chromaticity of red (R), green (G), and blue (B) when the lighting time of each spotted light source 33 is changed as explained in the present embodiment.

FIG. 26 shows relatively gathered chromaticity distribution of all red, green, and blue colors as compared to the chromaticity shifting of FIG. 25.

Figure 27:
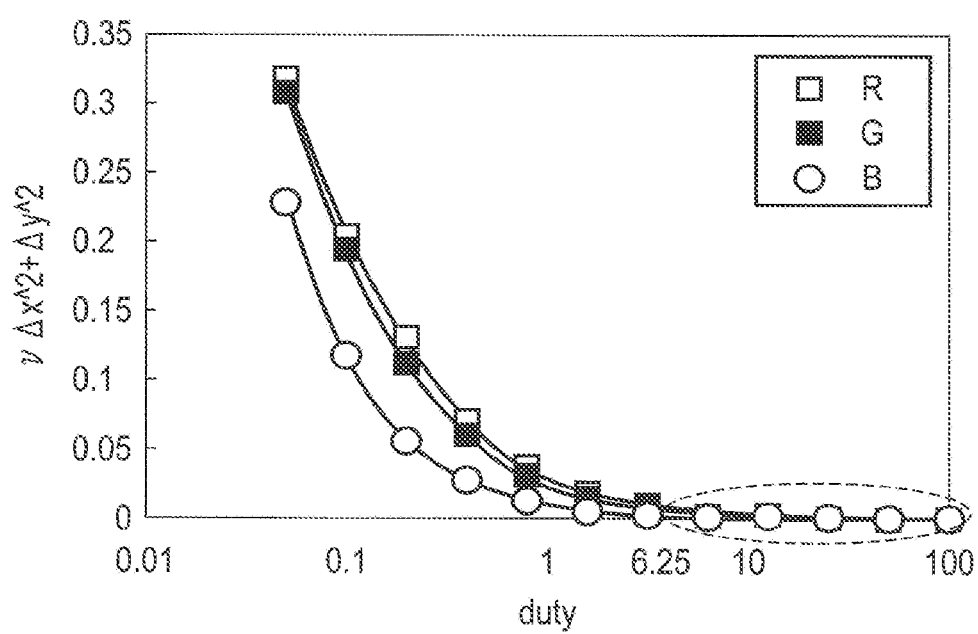
FIG. 27 shows a range of chromaticity shifting of each color component when the lighting time of each spotted light source is changed.

Note that, when the lighting time of the spotted light source 33 is changed, shifting of the chromaticity starts in all colors when Duty is, for example, 6.25, that is, ¹⁄₁₆ or less of the lighting time corresponding to the maximum gradation as shown in FIG. 27. In other words, when the lighting time of the spotted light source 33 is changed, shifting of the chromaticity does not occur when Duty is kept to a certain value or more. Thus, the part indicated by a dotted circle in FIG. 26 shows a shifting of the chromaticity occurring when the lighting time is extremely short, and the effect of the shifting of the chromaticity is not great.

On the other hand, when the current value supplied to the spotted light source 33 is changed as shown in FIG. 25, the green chromaticity is shifted by a slight change in the current value.

Figure 29:
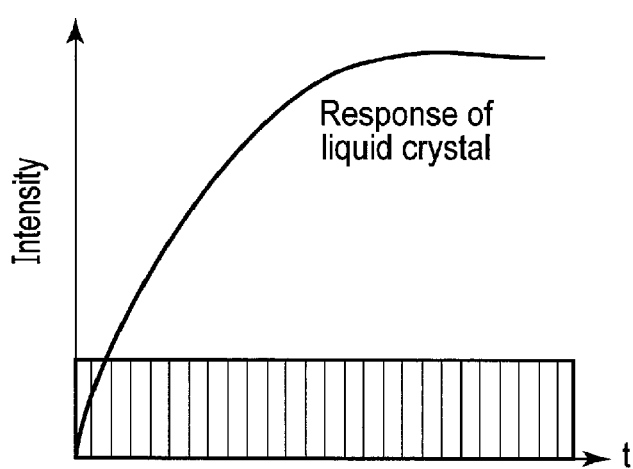
FIG. 29 shows a relationship between the response speed of the light modulation layer and the intensity and lighting time of the spotted light source.

Furthermore, FIGS. 28 and 29 each show a relationship between a response speed of the light modulation layer 24 (liquid crystal) in the display device 10 and the intensity and lighting time of the spotted light source 33. Note that the response speed explained here can be defined as a speed required to transit a light dispersion rate in a light modulation layer 24 to a certain level by applying a voltage to electrodes corresponding to the light modulation layer 24 into which light from the spotted light source 33 enters, for example.

Here, as described above, controlling the quantity of light of each spotted light source 33 by controlling the current value of the spotted light source 33 is referred to as current value control. On the other hand, controlling the quantity of light of each spotted light source 33 by controlling a PWM value of the spotted light source 33 is referred to as a PWM value control.

FIG. 28 shows a case where the quantity of light of a spotted light source 33 is reduced by shortening the lighting time of the spotted light source 33 by the PWM value control. On the other hand, FIG. 29 shows a case where the quantity of light of a spotted light source 33 is reduced by decreasing the intensity of the spotted light source 33 by the current value control.

In that case, if the current value control is used, the lighting time of the spotted light source 33 is long, and thus, the spotted light source 33 need to be illuminated at the time when the light modulation layer 24 does not respond, that is, at the time when the light modulation layer does not fully disperse light, as shown in FIG. 29. In contrast, if the PWM value control is used, as shown in FIG. 28, the spotted light source 33 can be illuminated in a state where the light modulation layer 24 can respond. That is, in the PWM value control, light of the spotted light source 33 can be efficiently used.

Thus, in consideration of the shifting in chromaticity when the gradation of each color component is achieved and efficient use of light from the spotted light source 33, the structure to achieve the gradation by the lighting time of each spotted light source 33, that is, the structure to control the quantity of light by the PWM value control is preferred.

Now, a case where a color is displayed on the basis of the signal values of RGB components of R=16, G=128, and B=16 in a target display cell is considered, for example. In that case, in consideration of the shifting of chromaticity and the efficient use of light from the spotted light source 33, the PWM value control is applied. Note that, a relationship between the intensity and lighting time of each spotted light source 33 and the applied voltage in this case is shown in FIG. 30.

In that case, the lighting time of the red and blue light sources 33 becomes $16/255$ of the lighting time corresponding to the maximum gradation, and the Duty is approximately 0.06. In the case of PWM value control, the lighting time of $1/16$ or less than the lighting time corresponding to the maximum gradation generates shifting in the chromaticity. In a case where a color is displayed on the basis of the signal values of RGB components of R=16, G=128, and B=16, the shifting in chromaticity may occur when the PWM value control is simply applied to each of the RGB components. (Combination of PWM Value Control and Current Value Control)

Here, in a case where the lighting time becomes less than a threshold value while the PWM value control is applied, for example, a combination of the PWM value control and the current value control may be used. Note that the threshold value in this case may be set to $1/16$ of the lighting time corresponding to the maximum gradation or the like.

Specifically, as shown in FIG. 31, the current value control is applied to the red and blue light sources 33 lighting time of which becomes $1/16$ or less than the lighting time corresponding to the maximum gradation when the PWM value control is applied, and the red and blue gradations are achieved by the intensity. On the other hand, the green chromaticity is shifted with a slight change in the current value, and thus, the current value control is not applied and the PWM value control is applied.

In such a structure, the combination of the PWM value control and the current value control can reduce the effect of the chromaticity shifting on the basis of the signal values of RGB components.

Note that, in this example, the combination of the PWM value control and the current value control is used; however, one of the PWM value control and the current value control may be selected on the basis of the signal values of RGB components and the selected control may be performed.

Furthermore, the above-described controlling the applied voltage to achieve the gradation may be combined with at least one of the PWM value control and the current value control. Specifically, for example, if G component of the signal values of RGB components is 16 (G=16), the shifting in chromaticity may occur in either the case where the PWM value control is applied or the case where the current value control is applied. In that case, the gradation of G component may be achieved by changing the applied voltage, that is, by the applied voltage control. Note that the gradation of R and G components may be performed by the PWM value control or the current value control.

Note that, when xyY system as the standard colorimetric system is applied, an acceptable range of shifting in chromaticity is generally $\Delta x=5/1000$ and $\Delta y=5/1000$. Thus, which one of the PWM value control, current value control, and applied voltage control is applied may be determined by checking whether or not the shifting in chromaticity above the acceptable range occurs in each control.

As described above, in the present embodiment, quantity of light of each of spotted light sources (red, green, and blue light sources) is controlled on the basis of an analyzation result (signal value of RGB components of each display cell) of image signals used for color display of image in a display area. In such a structure, quantity of light leaked from a glass can be reduced by decreasing the quantity of light of the spotted light sources 33 in accordance with RGB components of the color to be displayed in a target display cell. Thus, narrowing of color gamut of an image to be displayed caused by the light leaked from the glass can be suppressed (that is, the color gamut is widened), and the image to be displayed can be clearer.

Note that, in the present embodiment, the pulse width of the voltage applied to each spotted light source 33 is modulated, that is, the lighting time of each spotted light source 33 is adjusted (compensated) to control the quantity of light of each spotted light source 33.

Furthermore, in the present embodiment, the current supplied to each spotted light source 33, that is, the intensity of each spotted light source 33 is adjusted (compensated) to control the quantity of light of each spotted light source 33.

Specifically, the drive circuit 40 does not turn on at least one spotted light source 33 of the spotted light sources 33 when an image is displayed with only one color on the basis of the analyzation result of image signals (signal values of RGB components). For example, if the image is displayed with red alone, the green light source 33 and the blue light source 33 are not turned on. In such a structure, for example, light from the green and blue light sources 33 leaking from the glass can be suppressed, and thus, the image can be displayed with the light from the red light source 33. Thus, narrowing of color gamut caused by the light from the green and blue light sources 33 can be suppressed.

Furthermore, the drive circuit 40 may modulate the pulse width of voltage applied to at least one spotted light source (first light source) 33 of the spotted light sources 33 to control the quantity of light of the spotted light source 33, and may modulate the current supplied to at least one spotted light source (second light source) 33 of the spotted light sources 33 to control the quantity of light of the spotted light source 33. That is, different controls such as PWM value control or current value control may be performed to each color component displayed in a target display cell (spotted light source 33) on the basis of the signal values of RGB components. In such a structure, the gradation control without shifting in chromaticity can be performed in each color component, and thus, the quality of image can be improved.

Note that, in the present embodiment, the display device 10 is a liquid crystal display device using the polymer dispersed liquid crystal. However, the present embodiment may be applied to other display devices.

Furthermore, the display device 10 of the present embodiment utilizes the field sequential drive method. However, the display device 10 may be driven by other methods as long as an image can be color-displayed by light emitted from a plurality of light sources of different luminous colors.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Hereinafter, the inventions related to the embodiments will be cited.

[C1]

A display device comprising:
a plurality of light sources of different luminous colors;
a first substrate;
a second substrate opposed to the first substrate;
a liquid crystal layer interposed between the first and second substrates, to which light from the light sources enters;
a display area on which an image is displayed; and
a drive circuit configured to control quantity of light from each of the light sources on the basis of an analyzation result of an image signal used to display the image.

[C2]

The display device according to [C1], wherein the drive circuit modulates a pulse width of voltage applied to each of the light sources to control the quantity of light of each of the light sources.

[C3]

The display device according to [C2], wherein the drive circuit includes:

an analyzation circuit configured to acquire a signal value of a plurality of color components of the image by analyzing the image signal;
a compensation circuit configured to compensate a lighting time of each of the light sources on the basis of the signal value of the color components; and
a light source drive circuit configured to modulate the pulse width of voltage applied to each of the light sources in accordance with the compensated lighting time.

[C4]

The display device according to [C1], wherein the drive circuit modulates quantity of current supplied to each of the light sources to control the quantity of light of each of the light sources.

[C5]

The display device according to [C4], wherein the drive circuit includes:

an analyzation circuit configured to acquire a signal value of a plurality of color components of the image by analyzing the image signal;
a compensation circuit configured to compensate an intensity of each of the light sources on the basis of the signal value of the color components; and
a light source drive circuit configured to modulate quantity of current supplied to each of the light sources in accordance with the compensated intensity.

[C6]

The display device according to [C1], wherein the drive circuit is configured to sequentially turn on the light sources in a time division manner.

[C7]

The display device according to [C1], wherein the liquid crystal layer comprises a polymer dispersed liquid crystal.

[C8]

The display device according to [C1], wherein the drive circuit is configured not to turn on at least one of the light sources on the basis of the analyzation result of the image signal.

[C9]

The display device according to [C1], wherein the drive circuit is configured to control quantity of light of a first light source by modulating a pulse width of voltage applied to at least the first light source of the light sources, and control quantity of light of a second light source by modulating quantity of current supplied to at least the second light source of the light sources.

[C10]

A method of controlling a display device comprising a plurality of light sources of different luminous colors, a first substrate, a second substrate opposed to the first substrate, a liquid crystal layer interposed between the first and second substrates, to which light from the light sources enters, and a display area on which an image is displayed, the method comprising:

analyzing an image signal used to display the image; and
controlling quantity of light of each of the light sources on the basis of the analyzation result.

[C11]

The method according to [C10], wherein the controlling comprises controlling quantity of light of each of the light sources by modulating a pulse width of voltage applied to each of the light sources.

[C12]

The method according to [C11], wherein the controlling comprises:

acquiring a signal value of a plurality of color components of the image by analyzing the image signal;

compensating a lighting time of each of the light sources on the basis of the signal value of color components of the image; and modulating a pulse width of voltage applied to each of the light sources in accordance with the compensated lighting time.

[C13]

The method according to [C10], wherein the controlling comprises controlling quantity of light of each of the light sources by modulating quantity of current supplied to each of the light sources.

[C14]

The method according to [C13], wherein the controlling comprises:

acquiring a signal value of a plurality of color components of the image by analyzing the image signal;

compensating an intensity of each of the light sources on the basis of the signal value of the color components; and modulating quantity of current supplied to each of the light sources in accordance with the compensated intensity.

[C15]

The method according to [C10], further comprising turning on the light sources in a time division manner.

[C16]

The method according to [C10], wherein the liquid crystal layer comprises a polymer dispersed liquid crystal.

[C17]

The method according to [C10], wherein the controlling comprises not turning on at least one of the light sources on the basis of an analyzation result of the image signal.

[C18]

The method according to [C10], wherein the controlling comprises controlling quantity of light of a first light source by modulating a pulse width of voltage applied to at least the first light source of the light sources, and controlling quantity of light of a second light source by modulating quantity of current supplied to at least the second light source of the light sources.

What is claimed is:

1. A display device comprising:
a plurality of light sources of different luminous colors;
a first substrate;
a second substrate opposed to the first substrate;
a liquid crystal layer interposed between the first and second substrates, to which light from the light sources enters;
a display area on which an image is displayed; and
a drive circuit configured to control quantity of light from each of the light sources on the basis of analyzation results of a signal value corresponding to a pixel in the display area used to display the image and a lighting time of each of the light sources, wherein
the light sources are arranged on a side surface of a display panel including the first substrate, the second substrate, and the liquid crystal layer, and
the first and second substrates have optical transparency.

2. The display device according to claim 1, wherein the drive circuit modulates a pulse width of voltage applied to each of the light sources to control the quantity of light of each of the light sources.

3. The display device according to claim 2, wherein the drive circuit includes:

an analyzation circuit configured to acquire a signal value of a plurality of color components of the by analyzing the signal value corresponding to the pixel;

a compensation circuit configured to compensate the lighting time of each of the light sources on the basis of the signal value of the color components; and a light source drive circuit configured to modulate the pulse width of voltage applied to each of the light sources in accordance with the compensated lighting time.

4. The display device according to claim 1, wherein the drive circuit modulates quantity of current supplied to each of the light sources to control the quantity of light of each of the light sources.

5. The display device according to claim 4, wherein the drive circuit includes:

an analyzation circuit configured to acquire a signal value of a plurality of color components of the image by analyzing the signal value corresponding to the pixel;

a compensation circuit configured to compensate an intensity of each of the light sources on the basis of the signal value of the color components; and a light source drive circuit configured to modulate the quantity of current supplied to each of the light sources in accordance with the compensated intensity.

6. The display device according to claim 1, wherein the drive circuit is configured to sequentially turn on the light sources in a time division manner.

7. The display device according to claim 1, wherein the liquid crystal layer comprises a polymer dispersed liquid crystal.

8. The display device according to claim 1, wherein the drive circuit is configured not to turn on at least one of the light sources on the basis of the analyzation result of the signal value corresponding to the pixel.

9. The display device according to claim 1, wherein the drive circuit is configured to control quantity of light of a first light source by modulating a pulse width of voltage applied to at least the first light source of the light sources, and control quantity of light of a second light source by modulating quantity of current supplied to at least the second light source of the light sources.

10. A method of controlling a display device comprising a plurality of light sources of different luminous colors, a first substrate, a second substrate opposed to the first substrate, a liquid crystal layer interposed between the first and second substrates, to which light from the light sources enters, and a display area on which an image is displayed, the method comprising:

analyzing a signal value corresponding to a pixel in the display area used to display the image and a lighting time of each of the light sources; and controlling quantity of light of each of the light sources on the basis of analyzation results, wherein the light sources are arranged on a side surface of a display panel including the first substrate, the second substrate, and the liquid crystal layer, and the first and second substrates have optical transparency.

11. The method according to claim 10, wherein the controlling comprises controlling the quantity of light of each of the light sources by modulating a pulse width of voltage applied to each of the light sources.

12. The method according to claim 11, wherein the controlling comprises:

acquiring a signal value of a plurality of color components of the image by analyzing the signal value corresponding to the pixel;

compensating a lighting time of each of the light sources on the basis of the signal value of color components of the image; and modulating the pulse width of voltage applied to each of the light sources in accordance with the compensated lighting time.

13. The method according to claim 10, wherein the controlling comprises controlling the quantity of light of each of the light sources by modulating quantity of current supplied to each of the light sources.

14. The method according to claim 13, wherein the controlling comprises:
acquiring a signal value of a plurality of color components of the image by analyzing the signal value corresponding to the pixel;
compensating an intensity of each of the light sources on the basis of the signal value of the color components; and
modulating the quantity of current supplied to each of the light sources in accordance with the compensated intensity.

15. The method according to claim 10, further comprising turning on the light sources in a time division manner.

16. The method according to claim 10, wherein the liquid crystal layer comprises a polymer dispersed liquid crystal.

17. The method according to claim 10, wherein the controlling comprises not turning on at least one of the light sources on the basis of an analyzation result of the signal value corresponding to the pixel.

18. The method according to claim 10, wherein the controlling comprises controlling quantity of light of a first light source by modulating a pulse width of voltage applied to at least the first light source of the light sources, and controlling quantity of light of a second light source by modulating quantity of current supplied to at least the second light source of the light sources.

* * * * *